United States Patent
Nagatsu et al.

(10) Patent No.: US 9,512,590 B2
(45) Date of Patent: Dec. 6, 2016

(54) COMBINED STEEL SHEET PILE, DIAPHRAGM WALL, AND METHOD OF DISASSEMBLING COMBINED STEEL SHEET PILE

(75) Inventors: Ryosuke Nagatsu, Tokyo (JP); Shigeki Terasaki, Tokyo (JP); Kei Teshima, Tokyo (JP); Tetsuya Akahoshi, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 44 days.

(21) Appl. No.: 14/131,378

(22) PCT Filed: Jul. 13, 2012

(86) PCT No.: PCT/JP2012/067935
§ 371 (c)(1),
(2), (4) Date: Jan. 7, 2014

(87) PCT Pub. No.: WO2013/008915
PCT Pub. Date: Jan. 17, 2013

(65) Prior Publication Data
US 2014/0138427 A1    May 22, 2014

(30) Foreign Application Priority Data
Jul. 14, 2011    (JP) .................................. 2011-155708

(51) Int. Cl.
| B23K 31/00 | (2006.01) |
| B23K 31/02 | (2006.01) |
| B23K 31/10 | (2006.01) |
| E02D 11/00 | (2006.01) |
| B23K 37/08 | (2006.01) |

(Continued)

(52) U.S. Cl.
CPC ............... *E02D 11/00* (2013.01); *B23K 37/08* (2013.01); *E02D 5/28* (2013.01); *E02D 31/002* (2013.01)

(58) Field of Classification Search
CPC ......... E02D 5/04; E02D 11/00; E02D 29/02; E02D 31/002; E02D 5/08; E02D 5/28; Y10T 83/0259; Y10T 83/8773; Y10T 403/462; Y10T 409/308232; B23K 37/08
USPC ............................................... 83/698.11, 869
See application file for complete search history.

(56) References Cited

U.S. PATENT DOCUMENTS

| 2004/0093821 A1* | 5/2004 | Taenak ..................... E02D 5/08 52/590.2 |
| 2004/0101370 A1* | 5/2004 | Nishiumi .................. E02D 5/04 405/276 |

(Continued)

FOREIGN PATENT DOCUMENTS

| JP | 61-98817 A | 5/1986 |
| JP | 11-140864 A | 5/1999 |

(Continued)

OTHER PUBLICATIONS

JP2008-267069 computer english translation Jun. 11, 2015.*

(Continued)

*Primary Examiner* — Erin Saad
(74) *Attorney, Agent, or Firm* — Birch, Stewart, Kolasch & Birch, LLP

(57) ABSTRACT

A method of disassembling a combined steel sheet pile in which a steel sheet pile and an H-shaped steel are joined to each other, in which, when viewed in a cross-section perpendicular to a longitudinal direction, in a weld zone formed by a fillet weld, the weld zone is cut off to leave a portion on a side which is closer to the steel sheet pile than a throat depth surface, and thereby the combined steel sheet pile is disassembled into the steel sheet pile and the H-shaped steel.

4 Claims, 24 Drawing Sheets

(51) Int. Cl.
   *E02D 31/00* (2006.01)
   *E02D 5/28* (2006.01)

(56) References Cited

U.S. PATENT DOCUMENTS

| | | | |
|---|---|---|---|
| 2006/0110220 A1* | 5/2006 | Cable | E02D 5/28 405/254 |
| 2010/0151269 A1* | 6/2010 | Hermes | E02D 5/04 428/598 |

FOREIGN PATENT DOCUMENTS

| | | |
|---|---|---|
| JP | 2002-212943 A | 7/2002 |
| JP | 2005-299202 A | 10/2005 |
| JP | 2008-38490 A | 2/2008 |
| JP | 2008-267069 A | 11/2008 |
| TW | 201116670 A | 5/2011 |

OTHER PUBLICATIONS

Taiwanese Office Action dated May 13, 2015, issued in Taiwanese Patent Application No. 101125307.

International Search Report, mailed Oct. 9, 2012, issued in PCT/JP2012/067935.

Written Opinion of the International Searching Authority, mailed Oct. 9, 2012, issued in PCT/JP2012/067935.

* cited by examiner

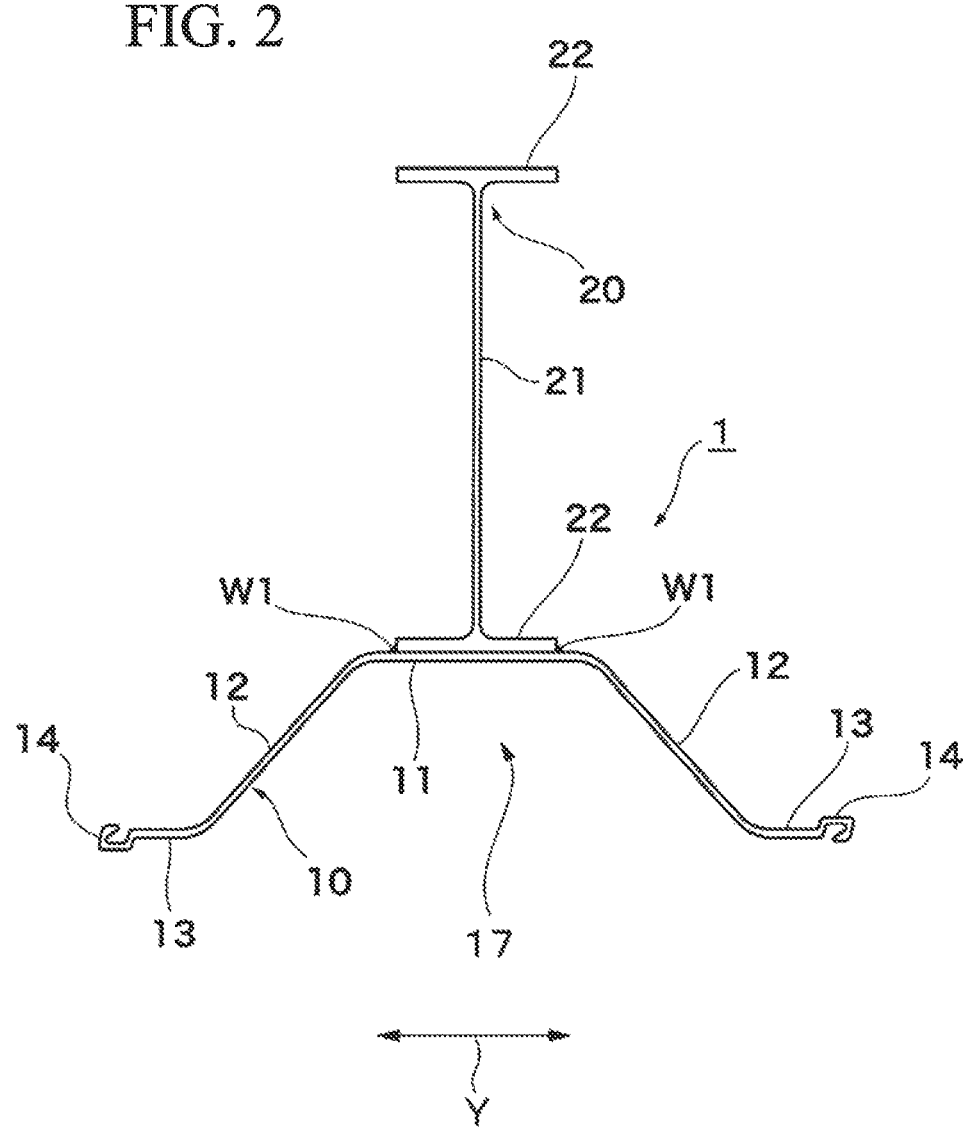

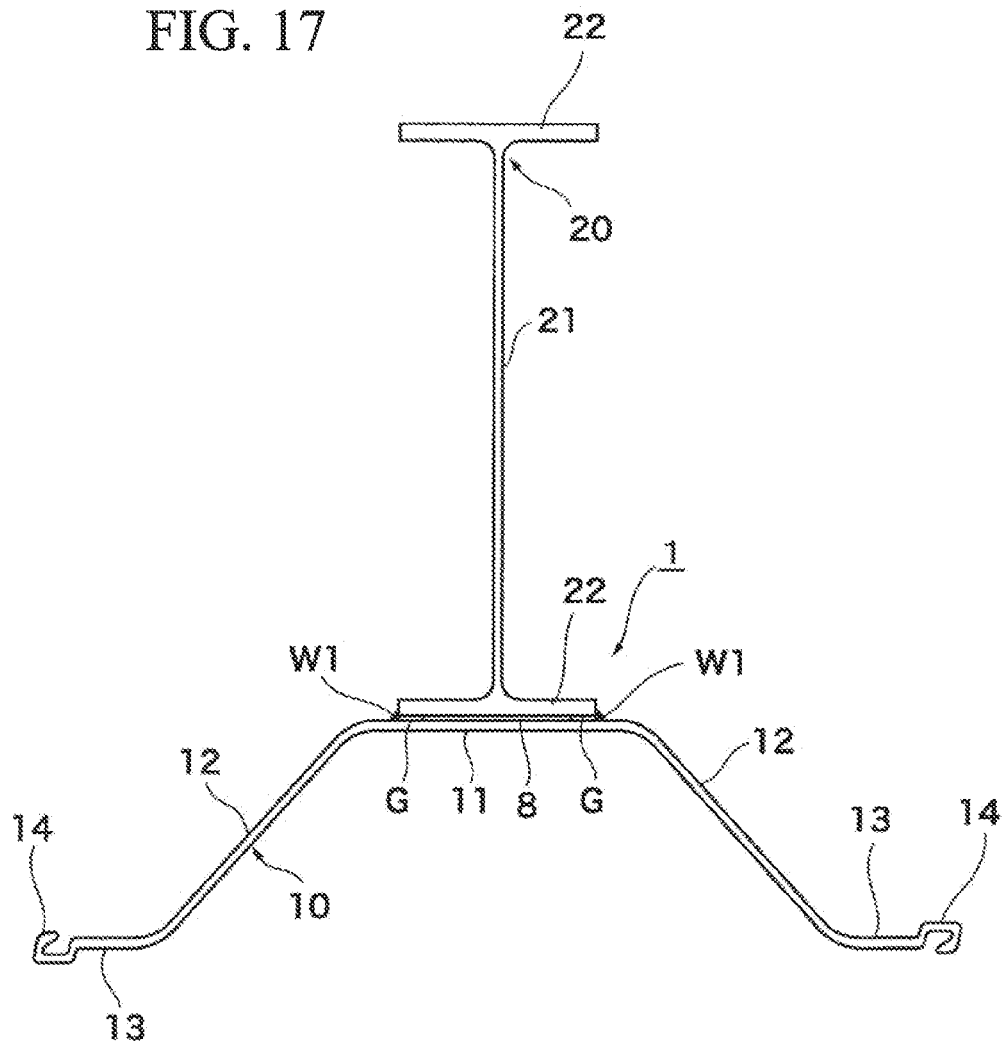

FIG. 27C
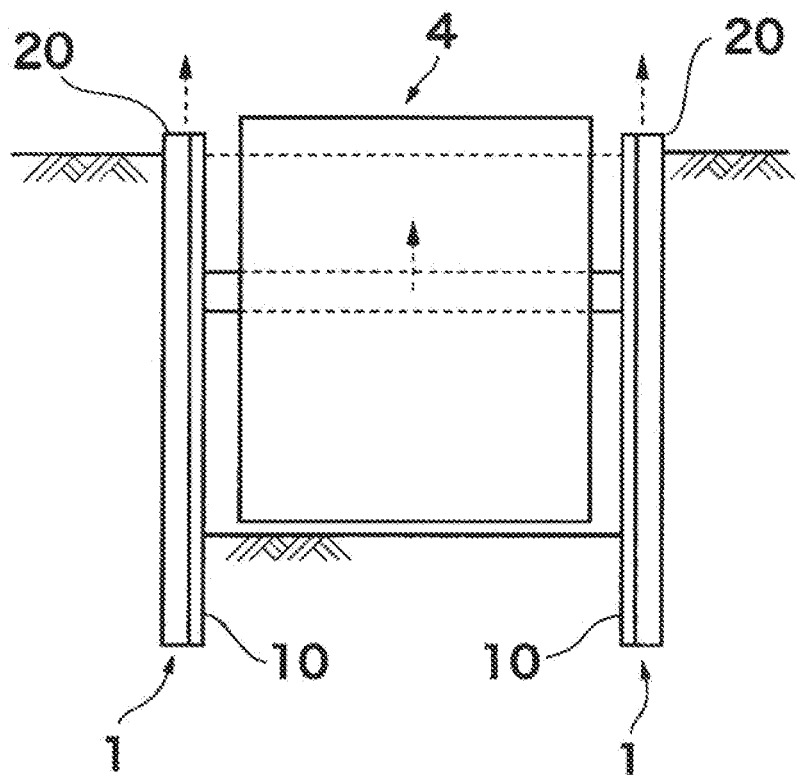
FIG. 27D
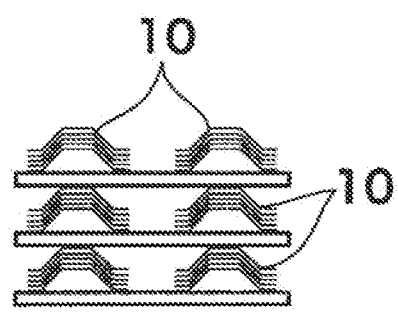
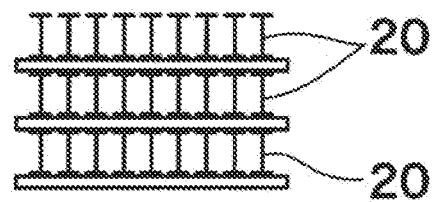

COMBINED STEEL SHEET PILE, DIAPHRAGM WALL, AND METHOD OF DISASSEMBLING COMBINED STEEL SHEET PILE

TECHNICAL FIELD

The present invention relates to a combined steel sheet pile for temporary installation, which is widely used as an earth-retaining wall or an underground structure wall mainly for preventing earth, sand, and the like from collapsing during construction and civil engineering work, a cofferdam in a river, and the like, and a diaphragm wall, and a method of disassembling a combined steel sheet pile.

Priority is claimed on Japanese Patent Application No. 2011-155708, filed on Jul. 14, 2011, the content of which is incorporated herein by reference.

BACKGROUND ART

Various construction methods have been suggested for underground construction by excavating the ground. As such construction methods, following methods are known. One example construction method includes installing a diaphragm wall for temporary installation in the ground, excavating a surface side thereof, and thereafter constructing a main body wall for main installation. Another example construction method includes constructing a soil cement wall or a cast-in-place reinforced concrete wall, which can be used for both temporary installation and main installation, in the ground.

However, among such construction methods in which the diaphragm wall for temporary installation is used, in a construction method in which a concrete-based wall body such as a soil cement wall or a cast-in-place reinforced concrete wall is used as a diaphragm wall for temporary installation, there is a problem in that the diaphragm wall for temporary installation cannot be removed after constructing the underground structure, and may cause issues when a new underground structure is constructed in the vicinity of the diaphragm wall for temporary installation, which was installed in advance.

In addition, as a construction method in which a steel-based wall body which can be pulled out and removed is used as the diaphragm wall for temporary installation, a soldier piles and lagging construction method and a steel sheet pile construction method are known. However, in these construction methods, in the cases where the depth of excavation is greater than about 10 m, there are problems in that in many cases the steel-based wall body has insufficient cross-sectional stiffness and is not easily applied, and in that ancillary structures such as a tie rod or an anchor are needed.

In order to deal with the above problems, as an earth-retaining member, which is a steel for the diaphragm wall having excellent cross-sectional stiffness and has a large cross-section to be applied to a construction in which the depth of excavation is about 10 m or greater, a steel pipe sheet pile in which a steel pipe with a slit having a diameter of about 165 mm is attached to a steel pipe of about 500 to 2000 mm as a joint has been used.

In addition, as another wall material having excellent cross-sectional stiffness to be used in the diaphragm wall, a combined steel sheet pile having a combination of a steel sheet pile and an H-shaped steel has been used. For example, a combined steel sheet pile in which a steel sheet pile and an H-shaped steel are joined together by continuous or intermittent welding is known.

For example, Patent Document 1 discloses a combined steel sheet pile in which an H-shaped steel is joined by welding to a linear steel sheet pile having left and right joints that are asymmetric in shape.

In addition, Patent Document 2 discloses, as illustrated in FIGS. 29A and 29B, a combined steel sheet pile 101 in which an H-shaped steel 130 is joined to a steel sheet pile 110 which has a hat-shaped cross-section and has left and right joints 111 that are asymmetric in shape. In order to join the H-shaped steel 130 to the steel sheet pile 110, the combined steel sheet pile 101 uses welds W as illustrated in FIG. 29A or uses joining bolts 141 and joining nuts 145 as illustrated in FIG. 29B.

In addition, Patent Document 3 discloses a combined steel sheet pile in which a processing tool is provided to one surface of front and rear surfaces of a steel sheet pile to cause a section steel such as an H-shaped steel to be fitted as a stiffener.

In addition, Patent Document 4 discloses a combined steel sheet pile formed of a steel sheet pile having a web at a center portion in the width direction and joints at both ends, and an H-shaped steel having flanges at the ends of a web, in which the web of the steel sheet pile and one flange of the H-shaped steel overlap each other and are joined together by a drill screw to protrude from the flange of the H-shaped steel.

PRIOR ART DOCUMENT

Patent Document

[Patent Document 1] Japanese Unexamined Patent Application, First Publication No. H11-140864
[Patent Document 2] Japanese Unexamined Patent Application, First Publication No. 2002-212943
[Patent Document 3] Japanese Unexamined Patent Application, First Publication No. 2005-299202
[Patent Document 4] Japanese Unexamined Patent Application, First Publication No. 2008-38490

DISCLOSURE OF THE INVENTION

Problem that the Invention is to Solve

The steel pipe sheet piles in the related art described above cannot be reutilized after use due to the steel pipes becoming deformed by soil and water pressure in many cases and thus are single-use. Therefore, there is a problem in that cost is increased. In addition, the steel pipe sheet pile has a hollow shape and is thus bulky during transport and storage, resulting in poor transport and storage efficiency. In this aspect, there is a problem of an increase in cost.

In the combined steel sheet pile, the web of the hat-shaped steel sheet pile and the flange of the H-shaped steel are joined together by fillet weld. Thus the combined steel sheet pile as a whole has a bulky cross-sectional form such as a Y-shaped cross-section. Therefore, there is also a problem of inefficient transport and storage. In addition, since these combined steel sheet piles are single-use, there is a problem of an increase in construction cost.

In the form in which the steel sheet pile and the H-shaped steel are joined together by the drill screws (drilling tapping screw) which penetrate through the flange of the H-shaped steel from the steel sheet pile side which is opposite side of the H-shaped steel and protrude from the flange, there is a concern that the tip end of the protruding drill screw may collide with a small obstacle such as stones at the time of being inserted into the ground and the drill screw may be bent. In addition, the threaded portion of the drill screw is damaged at the time of being inserted into and pulled out from the ground. Therefore, these combined steel sheet piles are single-use. In this joining form, originally, separating the steel sheet pile and the H-shaped steel for reutilization has not been considered. Even when reutilization is attempted, it is difficult to join steel sheet pile and the H-shaped steel to cause the drill screw to original screw hole to be aligned. In addition, since a new female threaded hole is worn, there is a problem in that the threaded hole provided in advance is left as a damaged portion. Moreover, since through-holes are provided in the H-shaped steel and the steel sheet pile, water paths are formed. Therefore, there is a problem in that water is likely to leak, and the drill screw is likely to become rusty.

The present invention has been made taking the foregoing circumstances into consideration, and an object thereof is to provide a combined steel sheet pile, which can be constructed as one body during installation, and which can be easily disassembled after being pulled out by cutting off a weld zone of fillet welding which joins a steel sheet pile to an H-shaped steel, a diaphragm wall thereof, and a method of disassembling a combined steel sheet pile.

Means for Solving the Problems

In order to accomplish the object to solve the problems, the present invention employs the following aspects.

(1) An aspect of the present invention is a method of disassembling a combined steel sheet pile in which an H-shaped steel flange of an H-shaped steel overlaps a web in one surface of a steel sheet pile including the web at a center portion in a sheet width direction and joints at both ends in the sheet width direction when viewed in a cross-section perpendicular to a longitudinal direction, and the steel sheet pile and the H-shaped steel are joined together by fillet weld at an end edge of the H-shaped steel flange, including: when viewed in the cross-section, in a weld zone formed by the fillet weld, cutting off the weld zone is performed to leave a portion on a side which is closer to the steel sheet pile than a throat depth surface, and disassembling the combined steel sheet pile into the steel sheet pile and the H-shaped steel.

(2) In the method of disassembling a combined steel sheet pile described in (1), a gap of 0.2 mm or more to 5 mm or less may be provided between the web of the steel sheet pile and the end edge of the H-shaped steel flange, and the disassembling may be performed by the cutting-off to reach the gap.

(3) In the method of disassembling a combined steel sheet pile described in (1) or (2), the gap may be provided by disposing a plate having a plate thickness dimension of 0.2 mm or more to 5 mm or less to be interposed between the web of the steel sheet pile and the end edge of the H-shaped steel flange.

(4) In the method of disassembling a combined steel sheet pile described in any one of (1) to (3), a steel rod may be further disposed to come into contact with the web of the steel sheet pile and the end edge of the H-shaped steel flange, and the disassembling of the combined steel sheet pile in which the steel sheet pile and the H-shaped steel are joined together by the fillet weld with the steel rod interposed therebetween may be performed by cutting off the weld zone to leave a larger amount of the steel rod on the steel sheet pile side than the end edge.

(5) In a combined steel sheet pile for which the method of disassembling a combined steel sheet pile described in (1) or (2) is used, the combined steel sheet pile may include the steel sheet pile and the H-shaped steel, and the gap may be provided between the web of the steel sheet pile and the end edge of the H-shaped steel flange.

(6) In a combined steel sheet pile for which the method of disassembling a combined steel sheet pile described in any one of (1) to (3) is used, the combined steel sheet pile may include the steel sheet pile and the H-shaped steel, and the gap may be provided by disposing the plate so as to be inserted between the web of the steel sheet pile and the end edge of the H-shaped steel flange.

(7) In a combined steel sheet pile for which the method of disassembling a combined steel sheet pile described in any one of (1) to (4) or the combined steel sheet pile described in (5) or (6) is used, the combined steel sheet pile may include the steel sheet pile and the H-shaped steel, and the steel rod may be disposed to come into contact with the web of the steel sheet pile and the end edge of the H-shaped steel flange, and the steel sheet pile and the H-shaped steel are joined together by the fillet weld with the steel rod interposed therebetween.

(8) In a combined steel sheet pile for which the method of disassembling a combined steel sheet pile described in any one of (1) to (4) or the combined steel sheet pile described in any one of (5) to (7) is used, when viewed in the cross-section, the steel sheet pile may include a pair of steel sheet pile flanges provided at both ends of the web, arms provided at tip ends of the steel sheet pile flanges, and the joints provided at tip ends of the arms and may be a hat-shaped steel sheet pile having a hat shape.

(9) In a combined steel sheet pile for which the method of disassembling a combined steel sheet pile described in any one of (1) to (4) or the combined steel sheet pile described in any one of (5) to (8) is used, the fillet weld may include a plurality of the weld zones and a plurality of unweld zones in the longitudinal direction of the combined steel sheet pile, the unweld zone may have a length which is a multiple of a length of the weld zone, and the weld zones and the unweld zones may be alternately arranged.

(10) A diaphragm wall which uses a combined steel sheet pile for which the method of disassembling a combined steel sheet pile described in any one of (1) to (4) or which uses the combined steel sheet pile described in any one of (5) to (9), includes a plurality of the combined steel sheet piles, and is constructed by fitting the joints of the combined steel sheet piles to one other.

Advantage of the Invention

According to the aspect described in (1), the following effects (I) to (IV) are obtained.

(I) Since the steel sheet pile and the H-shaped steel are disassembled by cutting off the weld zone of the fillet weld, the combined steel sheet pile can be separated into the steel sheet pile and the H-shaped steel, and the steel sheet pile and H-shaped steel can be separately transported and stored. Therefore, the transport and storage cost can be reduced compared to a case where the steel sheet pile and the H-shaped steel are integrated as one body.

(II) Since the H-shaped steel can be reutilized by replacing only the steel sheet pile that is likely to wear, the construction cost can be reduced. Even in the cases where the steel sheet piles become unusable after being used once as in the related art, H-shaped steels which account for approximately 60 to 70 percent of the entire steel weight can be reused for other purposes.

(III) The steel sheet piles can be reutilized in a case where a degree of wear thereof is low. Therefore, H-shaped steel having different sizes from those previously used can be combined for the next use, and even at construction sites where different cross-sectional stiffness is needed, acceptable wall body specifications can be achieved.

(IV) The amount of a weld bead of the H-shaped steel flange being left after grinding and separating can be reduced. Thus, an operation time to perform removal of the weld bead, grinding, and the like can be reduced during reutilization.

According to the aspect described in (2), since the combined steel sheet pile is disassembled into the steel sheet pile and the H-shaped steel, a cutting length (cutting distance) of the weld zone formed by the fillet weld can be shortened, thereby reducing an operation time. Moreover, even when the gap of about equal to or more than 0.2 mm and equal to or less than 5 mm is provided between the web of the steel sheet pile and the end portion (end edge) of the H-shaped steel flange, a reduction in the yield strength of the weld zone does not occur.

According to the aspect described in (3), the web of the steel sheet pile and the end portion (end edge) of the H-shaped steel flange can be easily welded while maintaining the gap therebetween without using a fixing jig or the like. In addition, in a case where the cutting-off is performed by grinding, the grinding may be performed to reach the gap, and thus cutting-off and disassembling can be easily achieved.

According to the aspect described in (4), even when a cross-sectional loss in the H-shaped steel flange occurs due to the grinding and separating, welding can be easily performed, and thus a new combined steel sheet pile can be easily formed. In addition, in a case where the cutting-off is performed by grinding or the like, by cutting off the weld zone of the fillet weld between the H-shaped steel and the steel rod, the steel sheet pile and the H-shaped steel can be easily disassembled.

According to the aspect described in (5), the combined steel sheet pile which enables a shortening of the cutting length (cutting distance) during the disassembling and a reduction in operation time can be achieved. Moreover, even when the gap of about equal to or more than 0.2 mm and equal to or less than 5 mm is provided between the web of the steel sheet pile and the flange end portion (end edge) of the H-shaped steel flange, a reduction in the yield strength of the weld zone does not occur.

According to the aspect described in (6), the combined steel sheet pile in which the web of the steel sheet pile and the end portion (end edge) of the H-shaped steel flange can be easily subjected to the fillet welding while maintaining the gap therebetween without using a fixing jig or the like can be achieved. Therefore, in a case where the cutting-off is performed by grinding, the grinding may be performed to reach the gap, and thus the combined steel sheet pile which can be easily cut off and disassembled can be achieved.

According to the aspect described in (7), even when a cross-sectional loss in the H-shaped steel flange occurs due to the grinding and separating, welding can be easily performed, and thus, the combined steel sheet piles can be refurbished. In addition, in a case where the cutting-off is performed by grinding, by cutting off the weld zone of the fillet weld which joins the H-shaped steel and the steel rod, the combined steel sheet pile which can be easily disassembled into the steel sheet pile and the H-shaped steel can be achieved.

According to the aspect described in (8), by using the hat-shaped steel sheet pile having excellent workability and high structural reliability, the combined steel sheet pile which is easily disassembled and reutilized can be achieved.

According to the aspect described in (9), cutting the weld zone in the combined steel sheet pile by grinding can be easily performed compared to a case where cutting is performed over the entire length in the longitudinal direction. In addition, a combined steel sheet pile can be achieved in which, during reutilization after the disassembling, fillet welding can be easily performed on clean portions (the end surface of the H-shaped steel in the flange width direction, or the web surface of the hat-shaped steel sheet pile) of the unweld zone.

According to the aspect described in (10), since the diaphragm wall is constructed by fitting the joints to each other and installing them using the combined steel sheet pile, in the diaphragm wall for temporary installation, the combined steel sheet pile can be separated and reutilized after being pulled out.

BRIEF DESCRIPTION OF THE DRAWING

FIG. 2 is an enlarged plan view of the combined steel sheet pile used in the diaphragm wall illustrated in FIG. 1A.

FIG. 17 is a diagram illustrating a modification example of the combined steel sheet pile illustrated in FIG. 2, and is a plan view illustrating the combined steel sheet pile in which a plate is disposed between the H-shaped steel and the steel sheet pile.

FIG. 27C is a schematic explanatory view illustrating an example of a method of pulling out the combined steel sheet pile from the diaphragm wall.

FIG. 27D is a schematic explanatory view illustrating an example of a method of storing the combined steel sheet pile pulled out from the diaphragm wall.

BEST MODE FOR CARRYING OUT THE INVENTION

Hereinafter, each of embodiments of the present invention will be described in detail with reference to the drawings. The present invention is not limited only to configurations of the following embodiments, and various modifications can be made without departing from the gist of the present invention. In addition, there may be cases where the drawings used in the following description have main parts enlarged for convenience to facilitate the understanding of the features of the present invention, and the dimension ratio and the like of each component are not limited to be the same as those in practice.

First, referring to a combined steel sheet pile, a diaphragm wall, and a method of disassembling a combined steel sheet pile according to a first embodiment, components which are common to the embodiments are described. Thereafter, a combined steel sheet pile, a diaphragm wall, and a method of disassembling a combined steel sheet pile of each of the embodiments will be described.

First Embodiment

Figure 1A:
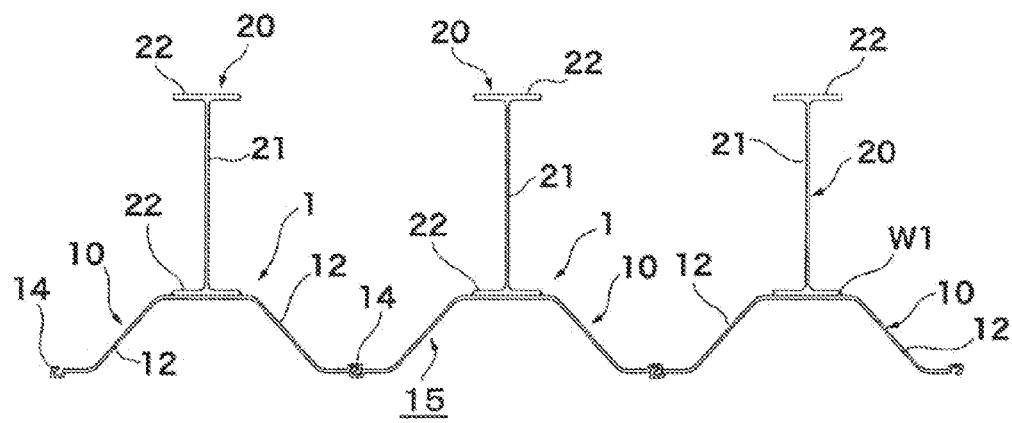
FIG. 1A is a plan view illustrating a diaphragm wall which uses a combined steel sheet pile according to a first embodiment of the present invention.
Figure 1B:
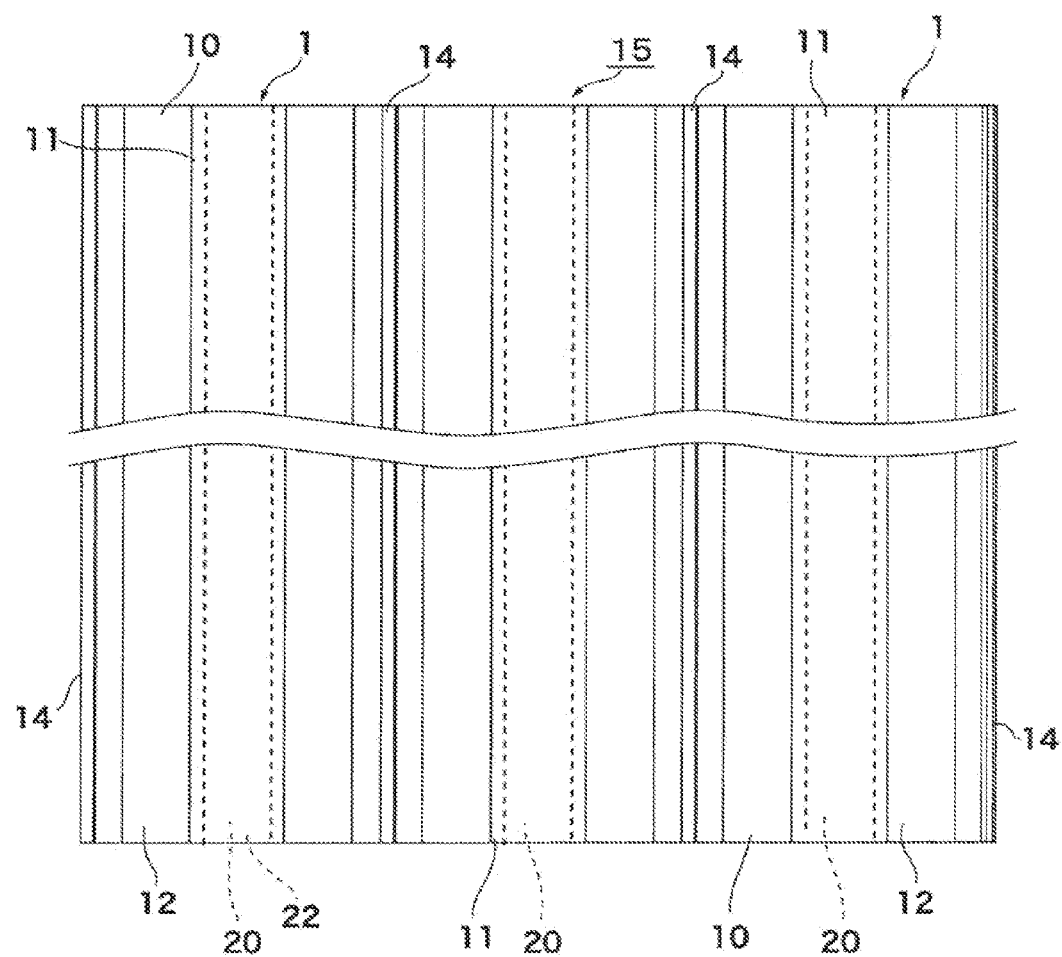
FIG. 1B is a partially cut away front view illustrating the diaphragm wall which uses the combined steel sheet pile according to the embodiment.
Figure 11:
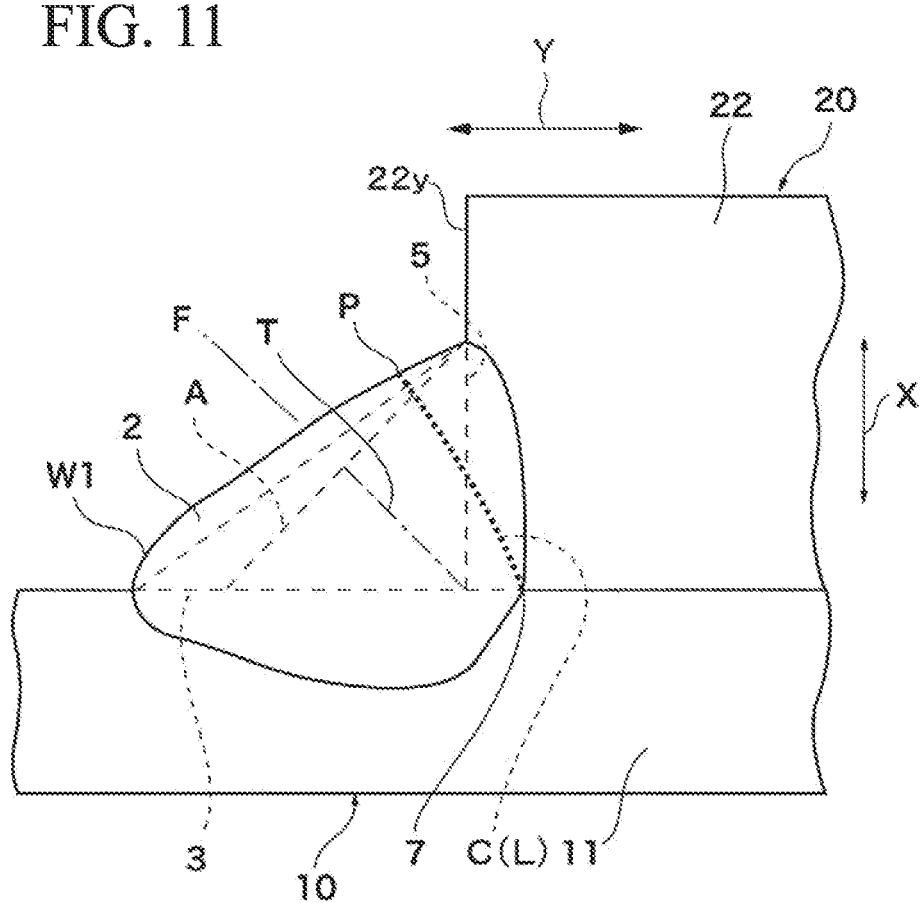
FIG. 11 is an enlarged plan view illustrating a weld zone of a fillet weld which joins a steel sheet pile to an H-shaped steel.

FIG. 1A is a plan view illustrating the diaphragm wall which uses the combined steel sheet pile according to the first embodiment of the present invention. FIG. 1B is a partially cut away front view illustrating the diaphragm wall which uses the combined steel sheet pile according to the embodiment. FIG. 2 is an enlarged plan view of the combined steel sheet pile used in the diaphragm wall illustrated in FIG. 1A. FIG. 11 is an enlarged plan view illustrating a weld zone (weld metal) of a fillet weld which joins a steel sheet pile to an H-shaped steel. As illustrated in these figures, the combined steel sheet pile 1 includes the steel sheet pile 10 and the H-shaped steel 20.

In the first embodiment, the steel sheet pile 10 is, when viewed in plan view, that is, when viewed in a cross-section perpendicular to the longitudinal direction of the combined steel sheet pile 1, configured as a hat-shaped steel sheet pile which includes a web 11 (steel sheet pile web) provided at the center portion in the sheet width direction, a pair of flanges 12 (steel sheet pile flanges) provided at both end portions of the web 11 to be tilted toward one surface side of the web 11, arms 13 provided at the tip ends of the flanges 12 to be parallel to the web 11, and joints 14 provided at the tip ends of the arms 13. The pair of flanges 12 are provided to be tilted so as to become distant from each other as they become distant from the web 11.

The steel sheet pile 10 may also be configured as, as well as the hat-shaped steel sheet pile, when viewed in the cross-section, a U-shaped steel sheet pile which includes a web 11 (steel sheet pile web) provided at the center portion in the sheet width direction, a pair of flanges 12 (steel sheet pile flange) provided at both the end portions of the web 11 to be tilted toward the one surface side of the web 11, and joints 14 provided at the tip ends of the flanges, and has a U-shape when viewed in the cross-section. Otherwise, the steel sheet pile 10 may also be configured as, when viewed in the cross-section, a linear steel sheet pile which includes a pair of joints 14 provided at both end portions of the steel sheet pile 10 and has a linear shape when viewed in the cross-section.

The shape of the joint 14 is adjusted to be fitted to the joint 14 of another steel sheet pile 10. In addition, the shape of the joint 14 is adjusted so that when the joint 14 is in a state of being fitted to the joint 14 of another steel sheet pile 10, the joints 14 are not separated from each other. When the diaphragm wall is constructed, the steel sheet piles 10 adjacent to each other are connected by allowing the corresponding joints 14 to be fitted to each other.

In addition, the steel sheet pile 10 of the first embodiment is a hot-rolled steel sheet pile molded by hot rolling. The steel sheet pile 10 has fitting grooves and locking claws molded so as not to be separated from each other when the joints 14 are in a state of being fitted to each other, and thus the strength of the joint 14 is increased. Otherwise, the steel sheet pile 10 may also be a cold-rolled steel sheet pile molded by cold-rolling.

The H-shaped steel 20 includes, when viewed in the cross-section, a web 21 (H-shaped steel web) and a pair of flanges 22 (H-shaped steel flanges) provided at both end portions of the web 21. The H-shaped steel 20 is joined by overlapping one flange 22 thereof and one surface of the web 11 (steel sheet pile web) of the steel sheet pile 10. In the first embodiment, the H-shaped steel 20 is joined by overlapping the one flange 22 thereof and a surface on the opposite side to a concave portion 17 constituted by the web 11 and the pair of flanges 12 (steel sheet pile flanges) of the steel sheet pile 10. Otherwise, the H-shaped steel 20 may be joined by overlapping the one flange 22 thereof and a surface on the side of the concave portion 17 constituted by the web 11 and the pair of flanges 12 (steel sheet pile flanges) of the steel sheet pile 10.

The one flange 22 of the H-shaped steel 20 overlaps with the one surface of the web 11 of the steel sheet pile 10, and the web 11 of the steel sheet pile 10 and an end edge 22y of the one flange 22 of the H-shaped steel 20 are joined together by fillet welds W1. Here, fillet welding is a method of welding two surfaces approximately orthogonal to each other, and is a welding in which a weld zone has a substantially triangular cross-section. The combined steel sheet pile 1 according to the above-described aspect of the present invention has a joining structure which can be assembled into the steel sheet pile 10 and the H-shaped steel 20 by cutting off weld zones 2 (weld metal) of the fillet welds W1 by which the steel sheet pile 10 and the H-shaped steel 20 are joined, by grinding. In this manner, by cutting off the weld zones 2 of the fillet welds W1 by which the web 11 of the steel sheet pile 10 and the end edge 22y of the flange 22 of the H-shaped steel 20 are joined, it is possible to disassemble the H-shaped steel 20 and the steel sheet pile 10 using a rotary cutting tool, fusing, a grinder, or the like.

Figure 12:
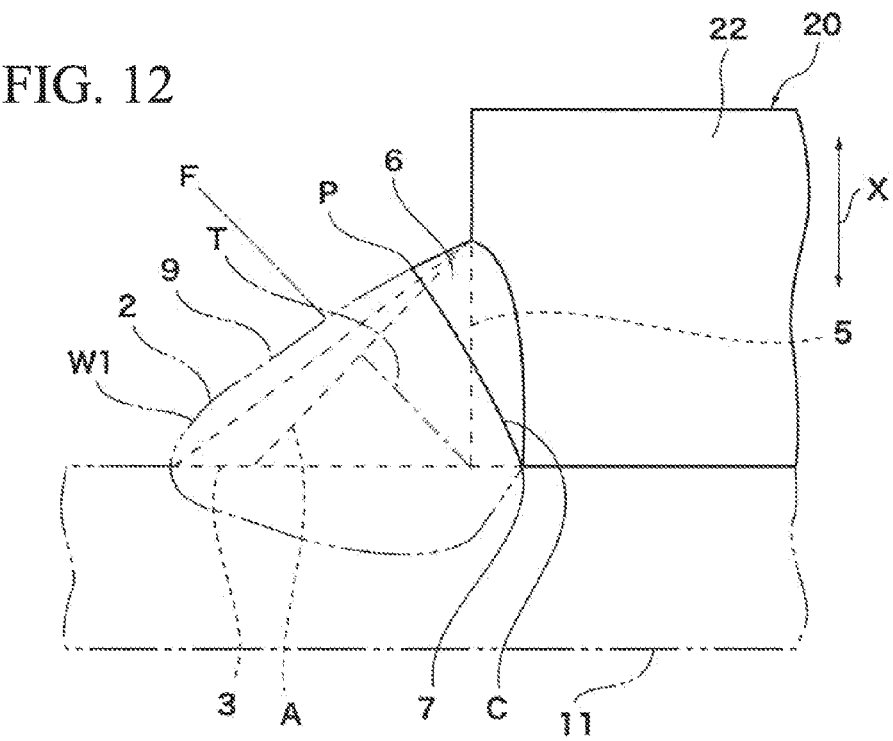
FIG. 12 is a diagram illustrating an example of cutting off the weld zone of the fillet weld illustrated in FIG. 11 using a disassembling method according to an aspect of the present invention, and is a plan view illustrating the shape of the H-shaped steel after the cutting-off with the solid line and illustrating the shape of the steel sheet pile with the two-dot chain line.
Figure 28A:
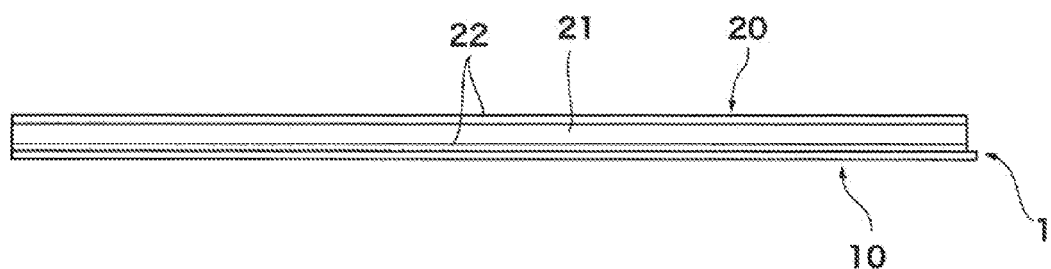
FIG. 28A is a side view illustrating a state where the combined steel sheet pile is pulled out of the diaphragm wall which uses the combined steel sheet pile according to an aspect of the present invention.
Figure 28B:
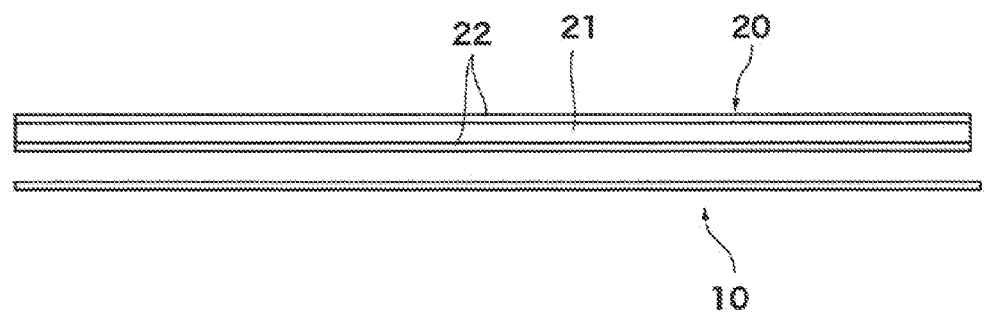
FIG. 28B is a side view illustrating an example of cutting off the weld zone of the fillet weld of the combined steel sheet pile illustrated in FIG. 28A and disassembling the steel sheet pile and the H-shaped steel.
Figure 29A:
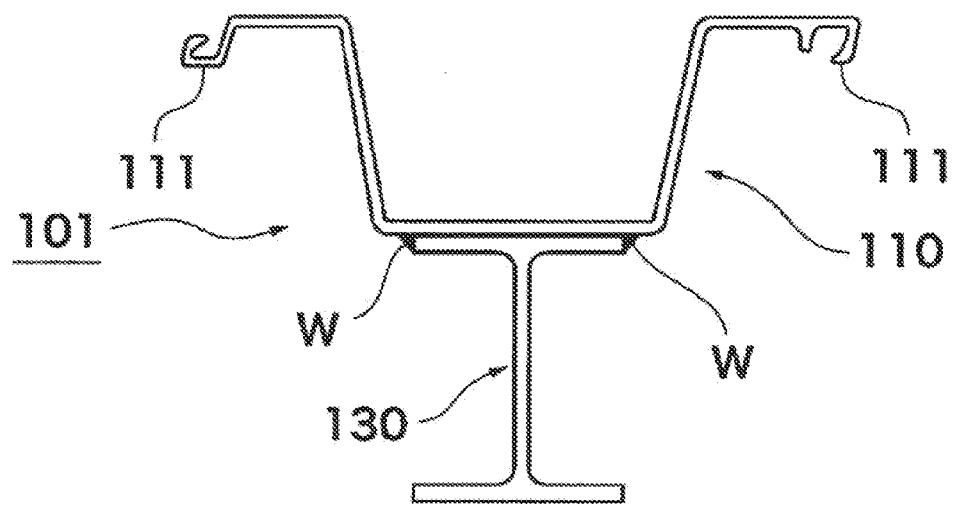
FIG. 29A is a plan view of a combined steel sheet pile according to the related art.
Figure 29B:
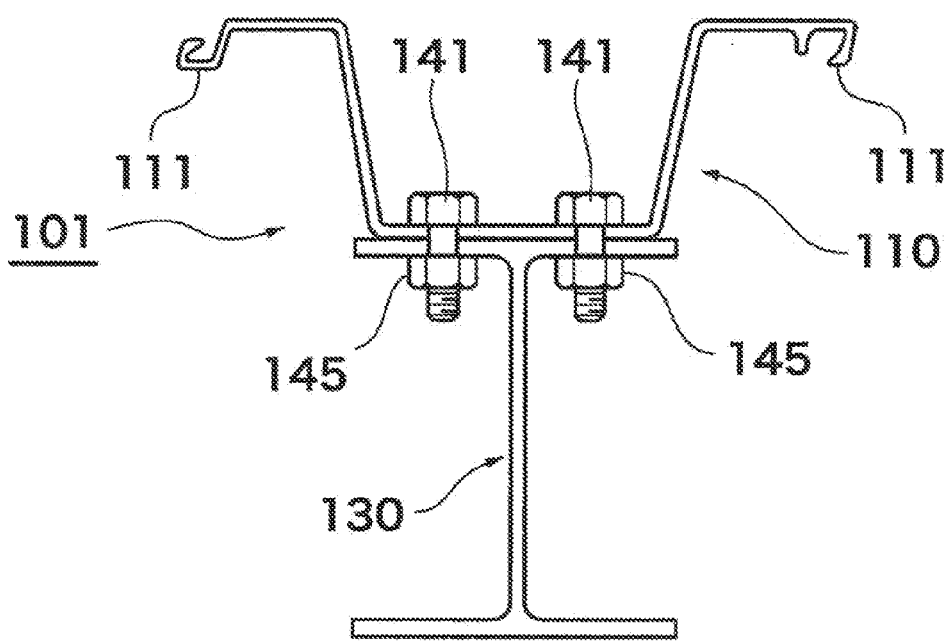
FIG. 29B is a plan view of the combined steel sheet pile according to the related art.

FIG. 12 is a diagram illustrating an example of cutting off the weld zone 2 of the fillet weld W1 illustrated in FIG. 11 using the disassembling method according to an aspect of the present invention, and is a plan view illustrating the shape of the H-shaped steel 20 after the cutting-off with the solid line and illustrating the shape of the steel sheet pile 10 with the two-dot chain line. FIG. 28A is a side view illustrating a state where the combined steel sheet pile 1 is pulled out of the diaphragm wall which uses the combined steel sheet pile 1 according to an aspect of the present invention. FIG. 28B is a side view illustrating an example of cutting off the weld zone 2 of the fillet weld W1 of the combined steel sheet pile 1 illustrated in FIG. 28A and disassembling into the steel sheet pile 10 and the H-shaped steel 20. As illustrated by the examples in these figures, after an underground structure such as the diaphragm wall or an earth-retaining wall accomplishes its object, the combined steel sheet pile 1 is pulled out and disassembled into the H-shaped steel 20 and the steel sheet pile 10 by efficiently cutting off the weld zone 2 of the fillet weld W1. In this manner, the steel sheet pile 10 and the H-shaped steel 20 are not allowed to be bulky such that each of the members can be stored or transported. The combined steel sheet pile 1 according to an aspect of the present invention becomes a combined steel sheet pile 1 which facilitates configuring of the steel sheet pile 10 and the H-shaped steel 20 to be assembled at a construction site of the diaphragm wall and disassembling thereof by cutting off the weld zone 2 of the fillet weld W1 at the site. Accordingly, the combined steel sheet pile 1 facilitates assembling and disassembling in a manufacturing factory of the combined steel sheet pile.

Hereinafter, the method of disassembling the combined steel sheet pile 1, which is common to the other embodiments described later, will be described in more detail.

Referring to FIGS. 1A, 2, and 11, the method of disassembling the combined steel sheet pile 1 will be described.

In the combined steel sheet pile 1 illustrated as the first embodiment, the one flange 22 (H-shaped steel flange) of the H-shaped steel 20 is disposed to overlap the surface of the web 11 on the opposite side to the concave portion 17 formed by the web 11 (steel sheet pile web) of the steel sheet pile 10 and the pair of flanges 12 (steel sheet pile flanges) so that the longitudinal direction of the H-shaped steel 20 and the longitudinal direction of the steel sheet pile 10 are parallel to each other.

Both the end edges 22y in the flange width direction Y of the one flange 22 of the H-shaped steel 20 have a leg length with a smaller dimension than that of the flange thickness of the flange 22, and are joined to the web 11 of the steel sheet pile 10 by the fillet welds W1 formed along the longitudinal direction. The combined steel sheet pile 1 as such has higher stiffness than that of a case where the steel sheet pile 10 is used alone.

As illustrated in FIG. 11, in a case where the flange 22 of the H-shaped steel 20 is welded to the web 11 of the steel sheet pile 10 by the fillet weld W1, a stable state is achieved by disposing the steel sheet pile 10 on the lower side, and thus the flange 22 of the H-shaped steel 20 is disposed on the upper side and is subjected to the fillet welding.

The combined steel sheet pile 1 is separated into the steel sheet pile 10 and the H-shaped steel 20 for storage by cutting off the weld zone 2 of the fillet weld W1, and is re-welded to be used as the combined steel sheet pile 1. At this time, in order to avoid weld failure, the weld zones 2 that are left in the steel sheet pile 10 and the H-shaped steel 20 have to be completely removed, and have to be ground until the base materials of the steel sheet pile 10 and the H-shaped steel 20 are exposed. Further, in the combined steel sheet pile 1, it is possible to reutilize the H-shaped steel 20, which is less likely to wear, by replacing only the steel sheet pile 10 in which the joints 14 of the steel sheet pile 10 are likely to wear and a ratio of the weight of the steel is small. Therefore, a method of disassembling (method of cutting off) the combined steel sheet pile 1 which can reduce a grinding time as much as possible and in which the weld zone 2 (weld metal) is less likely to be left in the flange 22 (H-shaped steel flange) of the H-shaped steel is desirable.

The above-mentioned fillet weld W1 has a bead shape with equal length legs in design (in theory) as illustrated by the dotted line A of FIG. 11. However, in practice, in a case of the welding method described above, like the weld zone 2 illustrated by the solid line of FIG. 11, the fillet weld W1 has a bead shape with unequal length legs, in which a long side 3 is on the web 11 side of the steel sheet pile 10 and a short side 5 is in the flange thickness direction X of the H-shaped steel 20, due to its own weight of the melted metal (welded metal) during welding. In addition, a boundary portion 7 between the web 11 of the steel sheet pile 10, the flange 22 of the H-shaped steel 20, and the weld zone 2 in the penetration depth direction is positioned to be shifted in the flange width direction Y of the H-shaped steel 20 unlike in design. The boundary portion 7 is positioned on the surface of the web 11 of the steel sheet pile 10 when the combined steel sheet pile 1 is viewed in the cross-section perpendicular to the longitudinal direction.

Here, when the combined steel sheet pile 1 is viewed in the cross-section perpendicular to the longitudinal direction, a surface along the longitudinal direction of the combined steel sheet pile 1, which includes a theoretical throat depth T, is defined as a throat depth surface F (illustrated by the one-dot chain line in FIG. 11). Similarly, when viewed in the cross-section, a surface, which includes a line segment L (illustrated by the thick dotted line in FIG. 11) connecting a weld bead surface P positioned on the flange 22 side of the H-shaped steel 20 from the throat depth surface F and the boundary portion 7 and is formed along the longitudinal direction of the combined steel sheet pile 1, is defined as a surface C (a substantially straight line or a curved line). When the surface C is a cutting surface for grinding to disassemble the combined steel sheet pile 1 into the steel sheet pile 10 and the H-shaped steel 20, the method of disassembling the combined steel sheet pile 1 which can reduce the grinding time to cut off and in which the weld zone 2 is less likely to be left in the flange 22 of the H-shaped steel 20 can be achieved.

Figure 13:
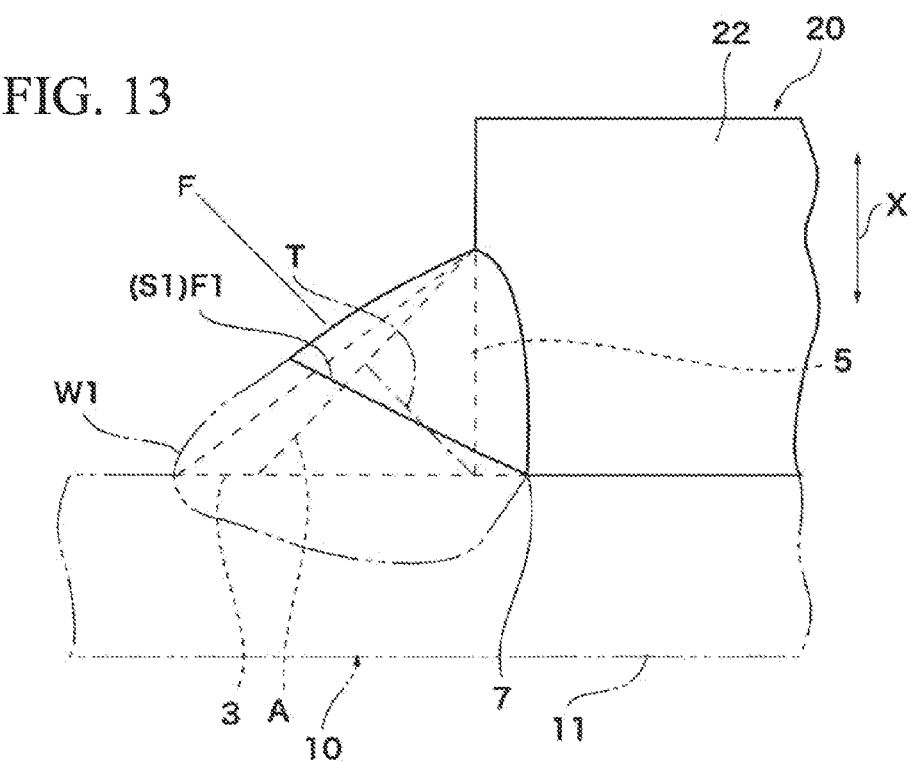
FIG. 13 is a diagram illustrating an example of cutting off the weld zone of the fillet weld illustrated in FIG. 11 by a disassembling method according to the related art, and is a plan view illustrating the shape of the H-shaped steel with the solid line and illustrating the shape of the steel sheet pile with the two-dot chain line.

FIG. 13 is a diagram illustrating an example of cutting off the weld zone 2 of the fillet weld W1 illustrated in FIG. 11 by a disassembling method according to the related art, and is a plan view illustrating the shape of the H-shaped steel 20 after the cutting-off with the solid line and illustrating the shape of the steel sheet pile 10 with the two-dot chain line. As illustrated in FIG. 13, when viewed in the cross-section, in a case where a surface F1 that intersects the throat depth surface F including the theoretical throat depth T is the cutting surface, a cutting distance S1 for cutting off the weld zone 2 (welded metal) of the fillet weld W1 is longer than that of the case where the surface C is the cutting surface.

Figure 14:
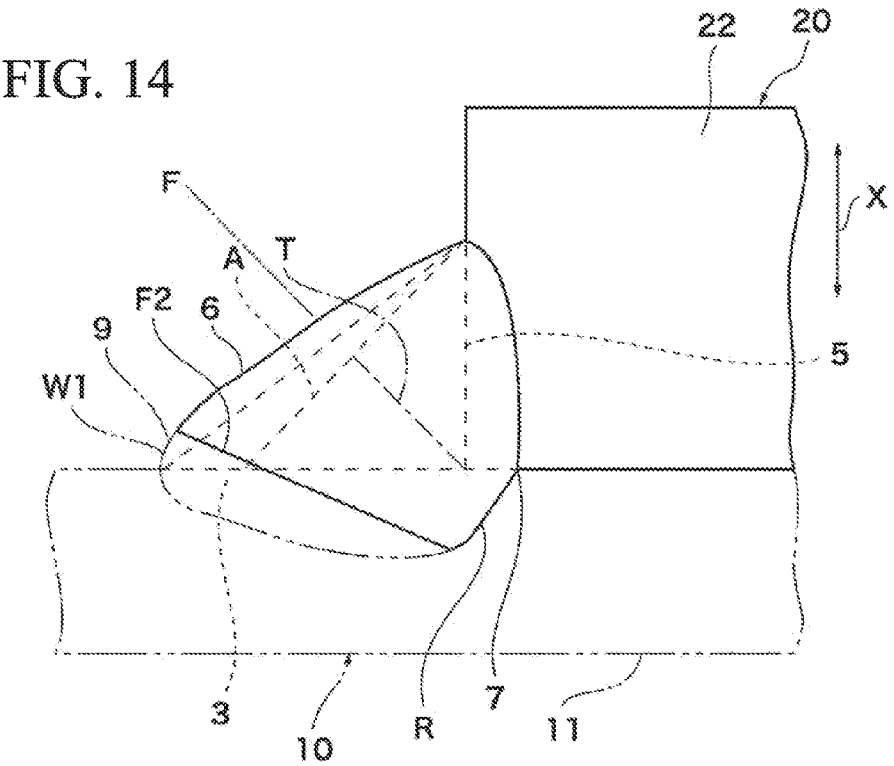
FIG. 14 is a diagram illustrating an example of cutting off the weld zone of the fillet weld illustrated in FIG. 11 by another disassembling method according to the related art, and is a plan view illustrating the shape of the H-shaped steel with the solid line and illustrating the shape of the steel sheet pile with the two-dot chain line.

FIG. 14 is a diagram illustrating an example of cutting off the weld zone 2 of the fillet weld W1 illustrated in FIG. 11 by another disassembling method according to the related art, and is a plan view illustrating the shape of the H-shaped steel 20 after the cutting-off with the solid line and illustrating the shape of the steel sheet pile 10 with the two-dot chain line. As illustrated in FIG. 14, when viewed in the cross-section, in a case where a surface F2 which does not intersect the throat depth surface F including the theoretical throat depth T but is on the web 11 side of the steel sheet pile 10 is the cutting surface, a joining region R of the weld zone 2 and the web 11 of the steel sheet pile 10 is left even after grinding. Therefore, there is a high concern of a form of cutting failure occurring.

FIG. 12 is a diagram illustrating an example of cutting off the weld zone 2 of the fillet weld W1 illustrated in FIG. 11 by the disassembling method according to the aspect of the present invention, and is a plan view illustrating the shape of the H-shaped steel 20 after the cutting-off with the solid line and illustrating the shape of the steel sheet pile 10 with the two-dot chain line. As illustrated in FIG. 12, when viewed in the cross-section, in a case where the surface C which does not intersect the throat depth surface F including the theoretical throat depth T and is on the flange 22 side of the H-shaped steel 20 is the cutting surface, the surface C is cut off by grinding, for example, using a grinder, and thus a cutting length (cutting distance) for cutting off the weld zone 2 (welded metal) of the fillet weld W1 can be shorten and a residual weld zone 6 (see FIG. 12) that is left in the flange 22 (H-shaped steel flange) of the H-shaped steel 20 can be reduced. That is, when viewed in the cross-section, by cutting off the weld zone 2 to allow a part of the weld zone 2 formed by the fillet weld W1 on a side which is closer to the steel sheet pile 10 than the throat depth surface F to be left, the residual weld zone 6 can be reduced. In addition, after the cutting-off, the weld zone 2 (welded metal) positioned on the steel sheet pile 10 side than the throat depth surface F is left as a residual weld zone 9 on the steel sheet pile 10 side. In addition, the grinder or the like has a certain degree of thickness dimension, and thus, when viewed in a direction which perpendicularly intersects the longitudinal direction of the combined steel sheet pile 1 and is parallel to the surface C, even though the surface C is formed in a curved line other than in a straight line so as to be slightly wobbled (swollen), it is possible to cut off the cutting surface including the boundary portion 7.

In addition, in a case where the one flange 22 of the H-shaped steel 20 and the web 11 of the steel sheet pile 10 are joined together by the fillet welds W1, the fillet weld W1 may have a single bead shape which is continuous in the longitudinal direction of the combined steel sheet pile 1, but may also be a plurality of fillet welds W1 which are intermittent in the longitudinal direction.

Figure 25:
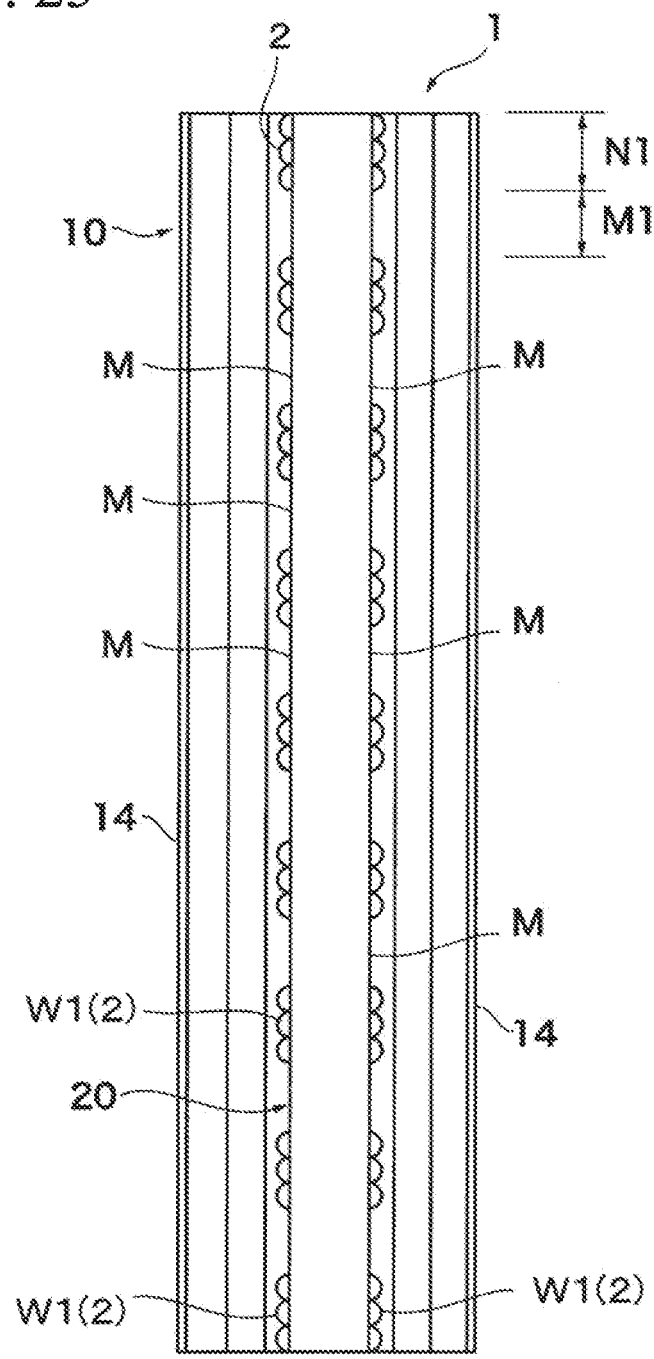
FIG. 25 is a diagram illustrating an example in which the combined steel sheet pile is joined by the fillet welds which are intermittent in the longitudinal direction, and is a rear view illustrating an example in which the weld zones of the fillet welds and unweld zones are alternately arranged.

FIG. 25 is a diagram illustrating an example in which the combined steel sheet pile 1 is joined by the fillet welds W1 which are intermittent in the longitudinal direction, and is a rear view illustrating an example in which the weld zones 2 of the fillet welds W1 and unweld zones M are alternately arranged. As illustrated in FIG. 25, when the weld zones 2 of the fillet welds W1 and the unweld zones M are alternately provided along the entire length or a part thereof in the longitudinal direction, in a case where the combined steel sheet pile 1 is disassembled and separated by cutting off the weld zone 2 of the fillet weld W1 and the steel sheet pile 10 and the H-shaped steel 20 are repeatedly used, the unweld zones M can be used as regions for welding, which is preferable. Therefore, the web 11 of the steel sheet pile 10 and the flange 22 of the H-shaped steel 20 can be easily joined and fixed by the fillet welds W1, which is preferable. In this case, there is no need to perform grinding of the residual weld zone 9 on the steel sheet pile 10 side and of the residual weld zone 6 on the H-shaped steel 20 side, which is left at the time of cutting off the weld zone 2 of the fillet weld W1. Therefore, a cutting-off time can be reduced. Further, the number of times at which the H-shaped steel 20 and the steel sheet pile 10 are repeatedly used can be increased. In addition, a length M1 of the unweld zone M in the longitudinal direction is preferably a multiple of a length N1 of the weld zone 2 in the longitudinal direction. In this manner, when the steel sheet pile 10 and the H-shaped steel 20 are reutilized, the same weld ratio in the longitudinal direction can be ensured. In other words, when the steel sheet pile 10 and the H-shaped steel 20 are re-welded, joining can be performed on the unweld zone M at least one or more times over the same length N1 as that of the weld zone 2 before the cutting-off. In this manner, the unweld zone M can be used without waste, which is efficient. In addition, FIG. 25 illustrates a case where the length N1 of the weld zone 2 and the length M1 of the unweld zone M are the same length (one time).

Figure 26:
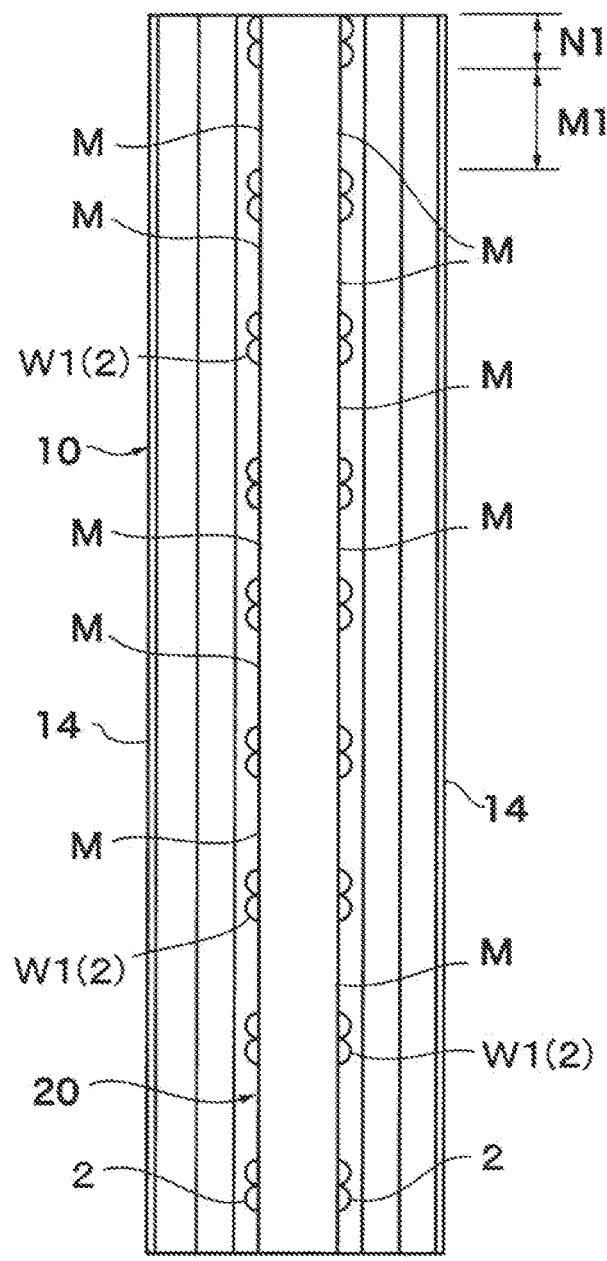
FIG. 26 is a diagram illustrating an example in which the combined steel sheet pile is joined by the fillet welds which are intermittent in the longitudinal direction, and is a rear view illustrating an example in which the length of the unweld zone is twice the length of the weld zone.

FIG. 26 is a diagram illustrating an example in which the combined steel sheet pile 1 joined by the fillet welds W1 which are intermittent in the longitudinal direction, and is a rear view illustrating an example in which the weld zones 2 of the fillet welds W1 and the unweld zones M are alternately arranged and the length M1 of the unweld zone M in the longitudinal direction is twice the length N1 of the weld zone 2 in the longitudinal direction. When the joining as illustrated in FIG. 26 is performed, in a case where the steel sheet pile 10 and the H-shaped steel 20 are cut off to be separated and thereafter are re-joined by the fillet welds W1 to constitute the combined steel sheet pile 1, the unweld zones M can be used as the regions for welding, which is preferable. Therefore, after the cutting-off, grinding of the residual weld zone 6 on the H-shaped steel 20 side or the residual weld zone 9 on the steel sheet pile 10 side is unnecessary, resulting in a reduction in operation time. In addition, as the value of the multiple is increased, the number of times at which joining by the fillet weld W1 can be performed can be increased without grinding of the residual weld zone 6 on the H-shaped steel 20 side and the residual weld zone 9 on the steel sheet pile 10 side.

As described above, when the length M1 of the unweld zones M is the multiple of the length N1 of the weld zone 2 and a ratio of the lengths of the unweld zones M and the weld zone 2 is maintained when the steel sheet pile 10 and the H-shaped steel 20 are reutilized and joined, the same weld ratio can be ensured in the combined steel sheet pile 1 before and after the disassembling and the re-assembling. In other words, when the steel sheet pile 10 and the H-shaped steel 20 are re-joined, welding can be performed on the unweld zone M at least one or more times over the same length N1 as that of the weld zone 2 before the cutting-off. In this manner, the unweld zone M can be used without waste, which is efficient. That is, it is preferable that the combined steel sheet pile 1 for which the disassembling method according to the embodiment is used be, when viewed in the cross-section, a hat-shaped steel sheet pile having a hat shape in which the steel sheet pile 10 includes the pair of steel sheet pile flanges 12 provided at both end portions of the web 11, the arms 13 provided at the tip ends of the steel sheet pile flanges 12, and the joints 14 provided at the tip end portions of the arms 13, the fillet welds W1 have the plurality of weld zones 2 and the unweld zones M in the longitudinal direction of the combined steel sheet pile 1, the unweld zones M have a length which is a multiple of the length of the weld zone 2, and the weld zones 2 and the unweld zones M are alternately arranged.

Next, a modification example in which the cutting distance of the fillet weld W1 can be further reduced in a case of cutting off the flange 22 of the H-shaped steel 20 and the web 11 of the steel sheet pile 10 will be described.

Figure 15:
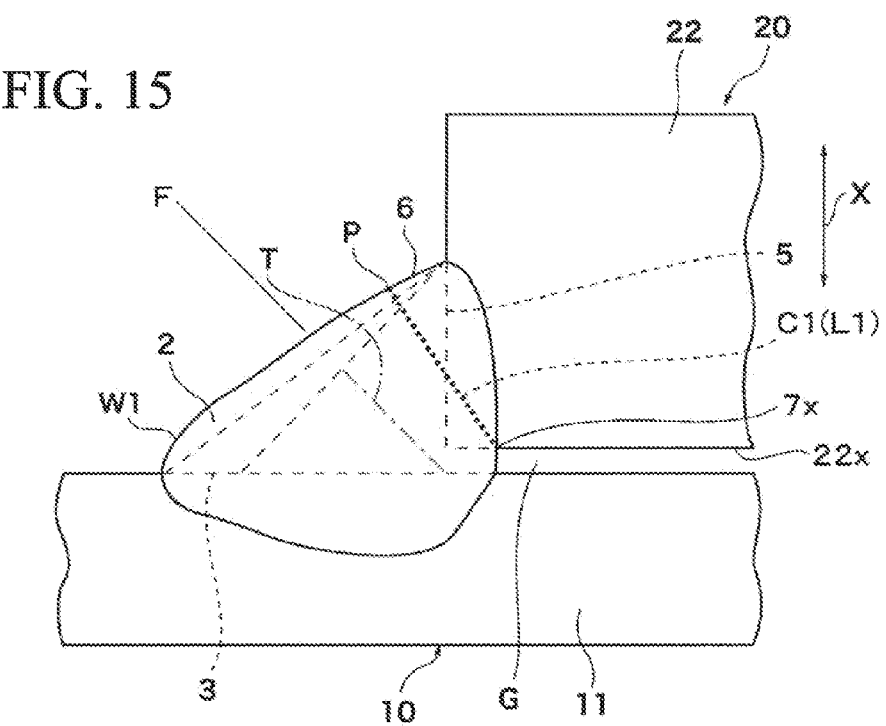
FIG. 15 is an enlarged plan view illustrating a weld zone of a fillet weld which joins the steel sheet pile and H-shaped steel with a gap provided therebetween.

FIG. 15 is an enlarged plan view illustrating the weld zone 2 of the fillet weld W1 which joins the steel sheet pile 10 and H-shaped steel 20 with a gap G provided therebetween. In the combined steel sheet pile 1 illustrated in FIG. 15, the gap G of equal to or more than 0.2 mm and equal to or less than 5 mm is provided in advance between an end portion 22x (end edge) in the flange thickness direction X of the flange 22 of the H-shaped steel 20 and the web 11 of the steel sheet pile 10. In addition, the gap G is preferably equal to or more than 1 mm and equal to or less than 5 mm, and more preferably equal to or more than 2 mm and equal to or less than 5 mm. It is preferable that, when the combined steel sheet pile 1 as such is viewed from the weld zone 2 of the fillet weld W1 as described above, that is, viewed in the cross-section perpendicular to the longitudinal direction, the weld zone 2 be cut off by the cutting method such as a grinder to allow a part of the weld zone 2 formed by the fillet weld W1 on the side closer to the steel sheet pile 10 than the throat depth surface F to be left. Specifically, as illustrated in FIG. 15, it is preferable that the weld zone 2 be cut off at the surface C1 as the cutting surface, which does not intersect the throat depth surface F including the theoretical throat depth T when viewed in the cross-section and is on the flange 22 side of the H-shaped steel 20. Here, when viewed in the cross-section, the surface C1 is defined as a surface which includes a line segment L1 connecting the weld bead surface P positioned on the flange 22 side of the H-shaped steel 20 than the throat depth surface F and a boundary portion 7x and is formed along the longitudinal direction of the combined steel sheet pile 1. In addition, when viewed in the cross-section, the boundary portion 7x is the boundary portion between the H-shaped steel 20, the gap G, and the weld zone 2.

Figure 16:
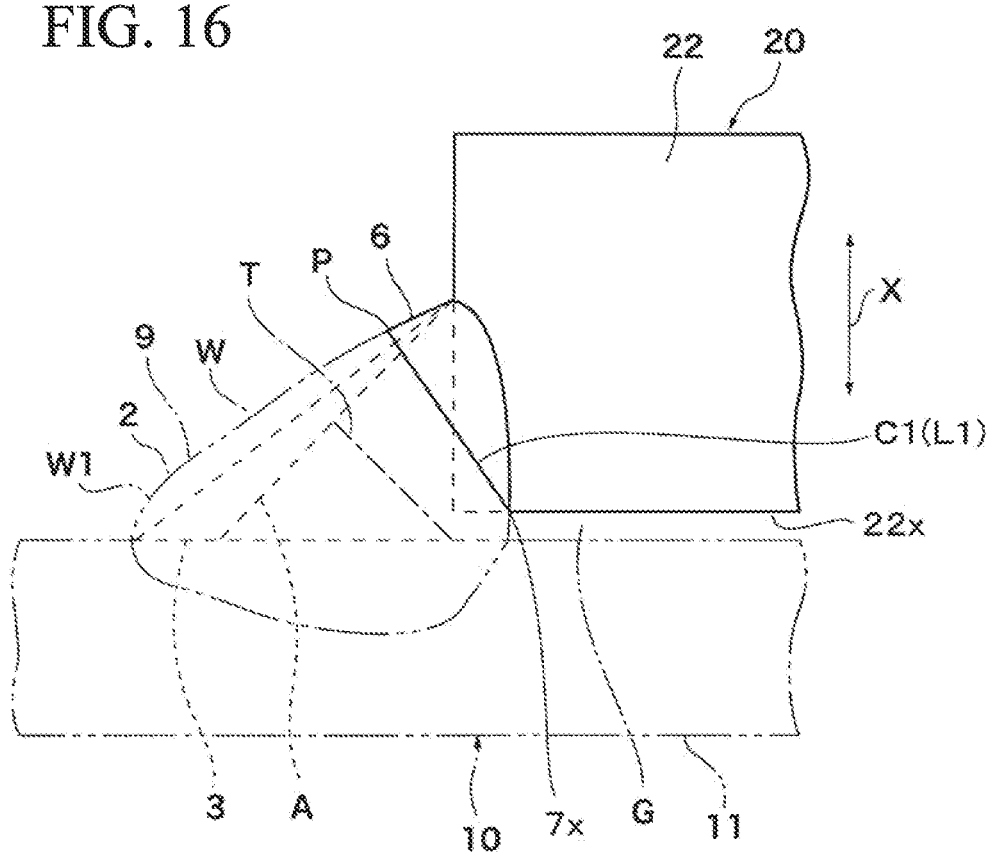
FIG. 16 is a diagram illustrating an example of cutting off the weld zone of the fillet weld illustrated in FIG. 15, and is a plan view illustrating the shape of the H-shaped steel after the cutting-off with the solid line and illustrating the shape of the steel sheet pile with the two-dot chain line.

FIG. 16 is a diagram illustrating an example of cutting off the weld zone 2 of the fillet weld W1 illustrated in FIG. 15 by the disassembling method according to the modification example, and is a plan view illustrating the shape of the H-shaped steel 20 after the cutting-off with the solid line and illustrating the shape of the steel sheet pile 10 with the two-dot chain line. By the cutting-off illustrated in FIG. 16, the cutting length (cutting distance) for cutting off the weld zone 2 (welded metal) of the fillet weld W1 can be shorten and the residual weld zone 6 which is left in the flange 22 (H-shaped steel flange) of the H-shaped steel 20 can be reduced. In addition, when the surface C1 on the flange 22 side of the H-shaped steel 20 is cut off as the cutting surface to reach the gap G, the combined steel sheet pile 1 can be cut off and disassembled without causing cutting scratches on the web 11 of the steel sheet pile 10. In addition, by providing the gap G, a state where the end portion 22x (end edge) of the flange 22 of the H-shaped steel 20 becomes distant from the web 11 of the steel sheet pile 10 is achieved. Therefore, a cutting distance in the case where the surface C1 is cut off as the cutting surface is further reduced compared to a case where the gap G is not provided.

When the fillet welds W1 are made by providing the gap G, the residual weld zone 6 can be reduced compared to a case where the gap G is not provided. Therefore, grinding of the residual weld zone 6 is unnecessary when the H-shaped steel 20 is reutilized after the cutting-off, and thus the operation time can be further reduced. In addition, although not illustrated in the figure, by driving a steel wedge (not illustrated) in the gap G between the flange 22 of the H-shaped steel 20 and the web 11 of the steel sheet pile 10, a force of separating the steel sheet pile 10 and the H-shaped steel 20 can be applied. Therefore, an operational load and an operation time during the grinding and separating operations using the grinder or the like can be reduced. For example, in a case where the fillet weld W1 is ground to be cut off, the fillet weld W1 may be ground by the grinder or the like so that a cutting surface is reliably shown on the H-shaped steel 20 side than the surface F including the theoretical throat depth T, and thereafter, by driving the steel wedge in the gap G, the H-shaped steel 20 and the steel 10 may be separated. In this case, in consideration of the tip end thickness of the wedge, the gap G is preferably equal to or more than 2 mm and equal to or less than 5 mm. Further, regarding the driving of the steel wedge for the separation, when the gap G is provided and the above-mentioned unweld zones M are further provided, the steel wedge is easily driven, which is preferable.

Figure 18A:
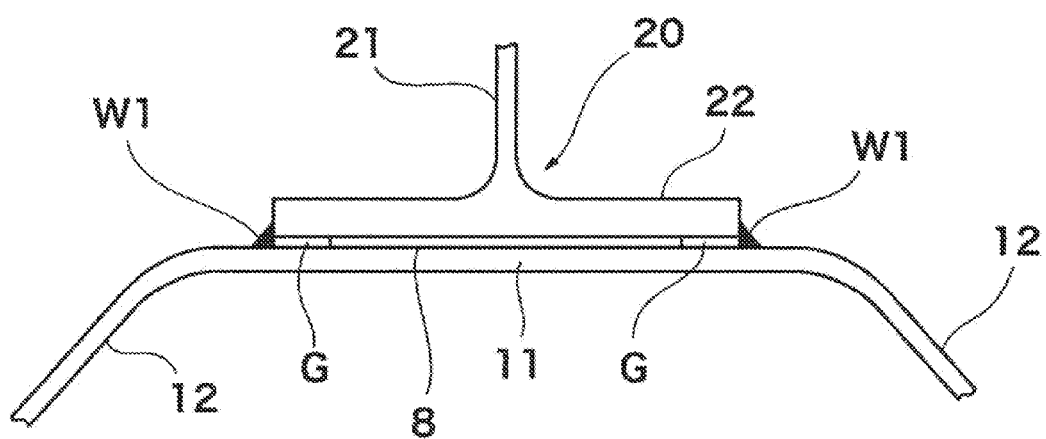
FIG. 18A is an enlarged plan view illustrating the flange of the H-shaped steel and the web of the steel sheet pile of the combined steel sheet pile illustrated in FIG. 17.
Figure 18B:
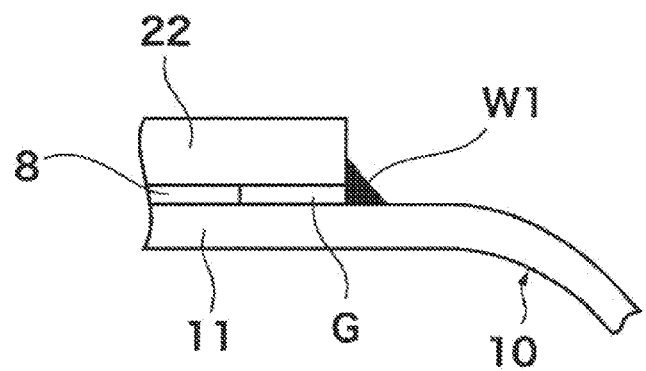
FIG. 18B is an enlarged plan view illustrating the weld zone of the fillet weld of the combined steel sheet pile illustrated in FIG. 17.

FIG. 17 is a plan view illustrating the combined steel sheet pile 1 in which a plate 8 is disposed between the H-shaped steel 20 and the steel sheet pile 10. FIG. 18A is an enlarged plan view illustrating the flange 22 of the H-shaped steel 20 and the web 11 of the steel sheet pile 10 of the combined steel sheet pile 1 illustrated in FIG. 17. FIG. 18B is an enlarged plan view illustrating the weld zone 2 of the fillet weld W1 of the combined steel sheet pile 1 illustrated in FIG. 17. In order to form the gap G, it is preferable that the plate 8 as illustrated in FIGS. 17, 18A, and 18B be disposed between the flange 22 of the H-shaped steel 20 and the web 11 of the steel sheet pile 10. While the gap G is easily formed by the plate 8, the steel sheet pile 10 and the H-shaped steel 20 can be joined together by the fillet welds W1. The plate width of the plate 8 has a smaller width dimension than the width dimension between the fillet welds W1, that is, is smaller than the flange width of the flange 22 of the H-shaped steel 20. Further, a rectangular steel plate, a bar-like steel plate, and a belt-like steel plate may be used as the plate 8. In addition, the plate 8 may be appropriately fixed to the flange 22 of the H-shaped steel 20 or the web 11 of the steel sheet pile 10 by a spot welding or the like. Since the plate width of the plate 8 is smaller than the flange width of the H-shaped steel 20, the gap G is formed between the plate 8 and the fillet weld W1 as illustrated in FIG. 18B. By disposing the plate 8 as such, the gap G may be formed between the flange 22 of the H-shaped steel 20 and the web 11 of the steel sheet pile 10. In addition, the plate 8 may also be fixed to the end portion of the H-shaped steel 20 or the steel sheet pile 10 in the longitudinal direction by a method such as a welding.

The material of the plate 8 is preferably a metal material from the viewpoint of strength, and may be another material, for example, plastic or wood as long as the gap G can be formed. In addition, the plate thickness of the plate 8 preferably has a dimension of, for example, equal to or more than 0.2 mm and equal to or less than 5 mm. The plate thickness of the plate 8 is equal to or more than 0.2 mm because a thickness of equal to or more than 0.2 mm is advantageous to the manufacture of a steel plate and causes a reduction in cost. In addition, the plate thickness of the plate 8 is preferably equal to or more than 1 mm, and more preferably equal to or more than 2 mm. In addition, when the plate thickness of the plate 8 is thicker than 5 mm, the gap G becomes too large, and thus there is a concern that the fillet welds W1 may not be sufficiently formed. Accordingly, it is preferable that the plate thickness of the plate 8 be equal to or less than 5 mm and the gap G be equal to or less than 5 mm.

Next, another modification example in which the cutting distance of the fillet weld W1 can be further reduced in a case of cutting off the flange 22 of the H-shaped steel 20 and the web 11 of the steel sheet pile 10 will be described.

Figure 19A:
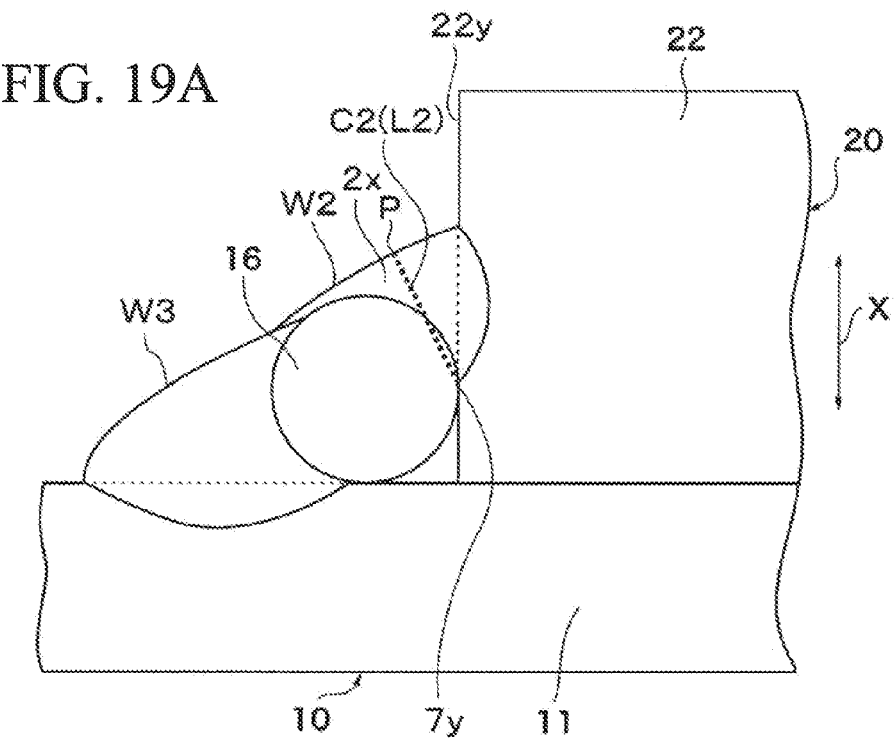
FIG. 19A is an enlarged plan view illustrating fillet welds of the combined steel sheet pile in which a steel rod is disposed to come into contact with the web of the steel sheet pile and the end edge of the flange of the H-shaped steel.

FIG. 19A is an enlarged plan view illustrating a fillet weld W2 and a fillet weld W3 of the combined steel sheet pile 1 in which a steel rod 16 is disposed to come into contact with the web 11 of the steel sheet pile 10 and the end edge 22y of the flange 22 of the H-shaped steel 20. In the combined steel sheet pile 1 illustrated in FIG. 19A, the steel rod 16 which comes into contact with the end edge 22y of the flange 22 of the H-shaped steel 20 and the web 11 of the steel sheet pile 10 is disposed. In addition, the steel sheet pile 10 and the H-shaped steel 20 are joined together by the fillet weld W2 joining the end edge 22y and the steel rod 16 and the fillet weld W3 joining the web 11 and the steel rod 16. That is, by fixing the steel rod 16 to the web 11 of the steel sheet pile 10 with the fillet weld W3 and by fixing the steel rod 16 to the flange 22 of the H-shaped steel 20 with the fillet weld W2, the combined steel sheet pile 1 in which the steel sheet pile 10 and the H-shaped steel 20 are integrated as one body is formed. It is preferable that the combined steel sheet pile 1 as such be cut off at a weld zone 2x of the fillet weld W2 by the grinder or the like to reduce the weld metal that is left in the H-shaped steel 20. Specifically, as illustrated in FIG. 19A, when viewed in the cross-section perpendicular to the longitudinal direction, it is preferable that the weld zone 2x of the fillet weld W2 on the flange 22 side of the H-shaped steel 20 be cut off at a surface C2 as the cutting surface. Here, when viewed in the cross-section, the surface C2 is defined as a surface which includes a line segment L2 connecting the weld bead surface P of the weld zone 2x of the fillet weld W2 and a boundary portion 7y and is formed along the longitudinal direction of the combined steel sheet pile 1. In addition, when viewed in the cross-section, the boundary portion 7y is the boundary portion between the H-shaped steel 20, the steel rod 16, and the weld zone 2x.

Figure 19B:
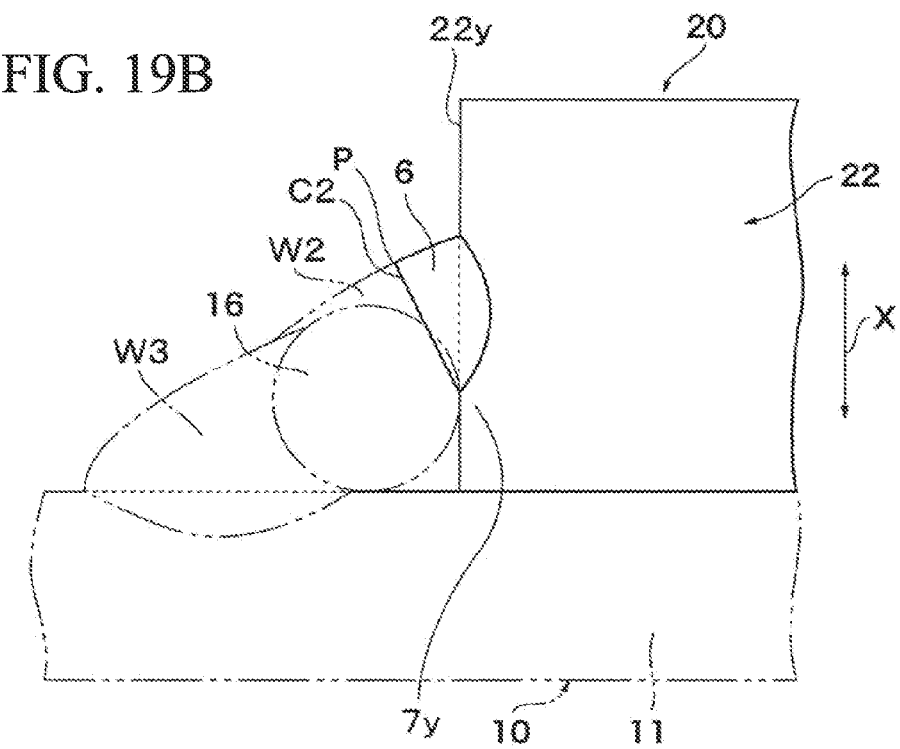
FIG. 19B is a diagram illustrating a state in which the weld zone of the fillet weld illustrated in FIG. 19A is cut off, and is a plan view illustrating the shape of the H-shaped steel after the cutting-off with the solid line and illustrating the shapes of the steel sheet pile and the steel rod with the two-dot chain line.

FIG. 19B is a diagram illustrating an example of cutting off the weld zone 2x of the fillet weld W2 illustrated in FIG. 19A by the disassembling method according to the modification example, and is a plan view illustrating the shape of the H-shaped steel 20 after the cutting-off with the solid line and illustrating the shapes of the steel sheet pile 10 and the steel rod 16 with the two-dot chain line. By the cutting-off illustrated in FIG. 19B, the cutting length (cutting distance) for cutting off the weld zone 2x (weld metal) of the fillet weld W2 can be shortened and the residual weld zone 6 which is left in the flange 22 (H-shaped steel flange) of the H-shaped steel 20 can be reduced. In addition, when the surface C2 of the weld zone 2x of the fillet weld W2 on the flange 22 side of the H-shaped steel 20 is cut off as the cutting surface, the cutting length (cutting distance) can be further reduced compared to any of the cases described above. Further, after the cutting-off, the entire steel rod 16 or the substantially entire steel rod 16 is left in the web 11 of the steel sheet pile 10 with the fillet weld W3. That is, it is preferable that the weld zone 2x of the combined steel sheet pile 1 be cut off so that a larger amount of the steel rod 16 is left on the web 11 side of the steel sheet pile 10 than that at the end edge 22y of the H-shaped steel 20. By the cutting-off as such, the residual weld zone 6 which is left in the end edge 22y of the flange 20 of the H-shaped steel 20 can be preferably reduced, and thus grinding of the residual weld zone 6 is unnecessary when the H-shaped steel 20 is reutilized after the cutting-off, resulting in a further reduction in operation time. In addition, when the steel sheet pile 10 and the H-shaped steel 20 are joined together by the fillet welds W2 and the fillet welds W3 with the steel rods 16 interposed therebetween, it is more preferable that joining be performed to further provide the unweld zones M. In this manner, in a case where the steel sheet pile 10 and the H-shaped steel 20 are re-joined by using the unweld zones M after cutting off and disassembling the combined steel sheet pile 1 having the steel rods 16 and the unweld zones M, it is unnecessary to remove the residual weld zone 6.

Figure 22:
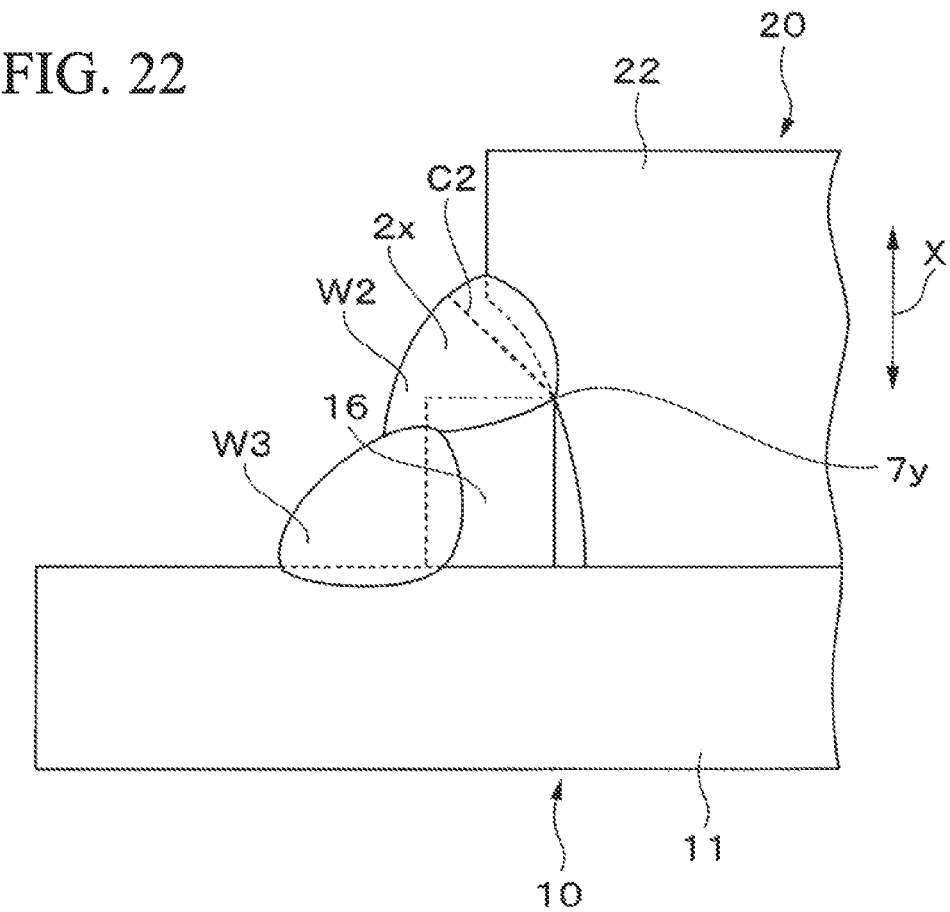
FIG. 22 is a plan view illustrating an example in which, after the steel sheet pile and the H-shaped steel are disassembled and the weld zone of the fillet weld is ground, the steel sheet pile and the H-shaped steel are joined again by the fillet welds with a rectangular steel rod interposed therebetween.

The shape of the steel rod 16 may also be square, rectangular, or triangular other than the circular shape illustrated in FIG. 19A when viewed in the cross-section perpendicular to the longitudinal direction. For reference, a modification example in which a rectangular steel plate is used as the steel rod 16 is illustrated in FIG. 22. The combined steel sheet pile 1 illustrated in FIG. 22 has the same technical features except that the shape of the steel rod 16 is rectangular. In addition, the material of the steel rod 16 is preferably steel from the viewpoint of weldability, and may be also another material such as pure iron, stainless steel, copper, or nickel as long as the welding of difference types of materials to the steel sheet pile 10 and the H-shaped steel 20 is possible. In addition, the steel rod 16 may be fixed to a part or the entirety of the combined steel sheet pile 1 in the longitudinal direction by the fillet welds W2 and the fillet welds W3 which are continuous or intermittent.

Figure 20:
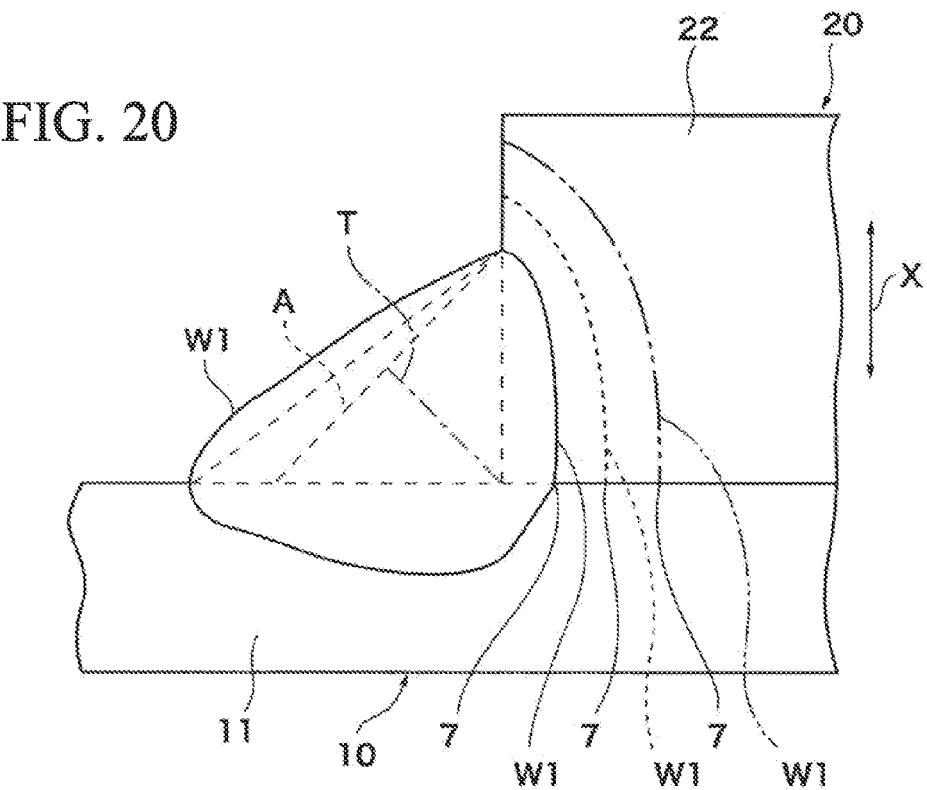
FIG. 20 is a plan view illustrating a welding range and a grinding range in a case where joining by the fillet weld and grinding for reutilization are repeated.

FIG. 20 is a plan view illustrating a welding range and a grinding range in a case where joining by the fillet weld W1 and grinding for reutilization are repeated. Compared to the cutting-off as illustrated in FIGS. 19A and 19B, in a case where the fillet weld W1 is repeatedly performed without the use of the steel rod 16, as illustrated in FIG. 20, the welding range and the grinding range on the flange 22 side of the H-shaped steel 20 gradually widen to a fillet weld W1 illustrated by the sold line, a fillet weld W1 illustrated by the dotted line, and a fillet weld W1 illustrated by the two-dot chain line. Therefore, the amount of welds is increased for reutilization, resulting in the degradation in economic efficiency.

Figure 21:
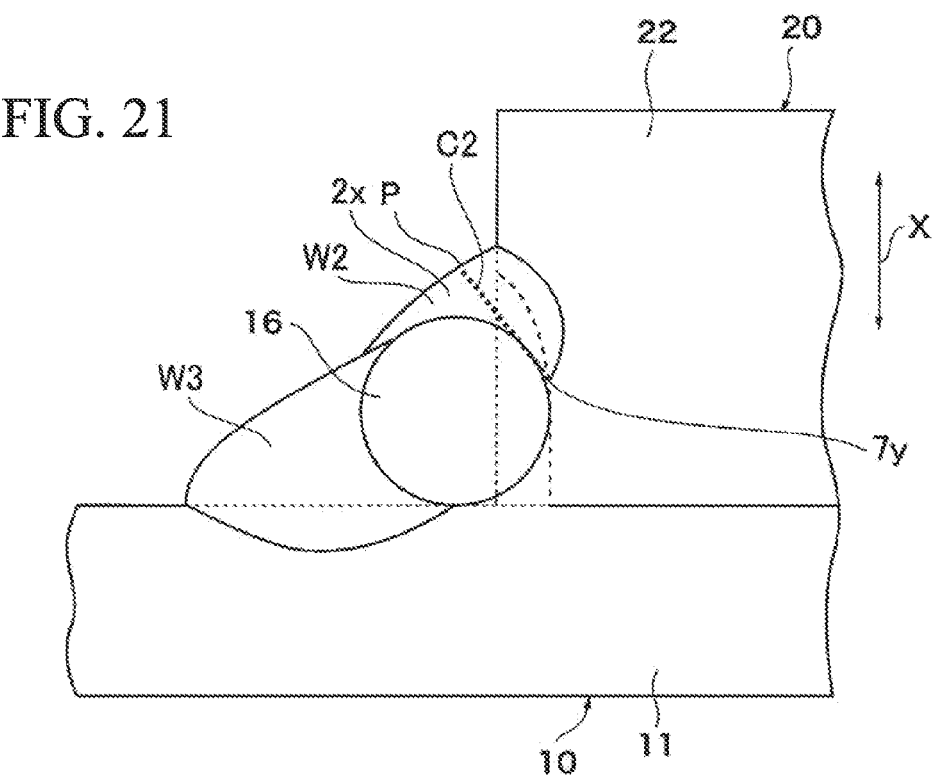
FIG. 21 is a plan view illustrating an example in which, after the steel sheet pile and the H-shaped steel are disassembled and the weld zone of the fillet weld is ground, the steel sheet pile and the H-shaped steel are joined again by the fillet welds with the steel rod interposed therebetween.

FIG. 21 is a plan view illustrating an example in which, after the steel sheet pile 10 and the H-shaped steel 20 are disassembled and the weld zone 2 of the fillet weld W1 is ground, the steel sheet pile 10 and the H-shaped steel 20 are joined again by the fillet weld W2 and the fillet weld W3 with the steel rod 16 interposed therebetween. As illustrated in FIG. 21, the steel sheet pile 10 and the H-shaped steel 20 are joined together by the fillet weld W2 and the fillet weld W3 with the steel rod 16 interposed therebetween so as to be reutilized, and thus the welding range can be reduced, which is preferable. In addition, the degree of wear of the flange 22 of the H-shaped steel 20 is reduced, and thus the number of times at which the H-shaped steel 20 can be reutilized is increased. FIG. 21 illustrates an example in which, in a case where the combined steel sheet pile 1 is assembled by joining the steel sheet pile 10 and the H-shaped steel 20, joining is performed as a first joining by the fillet weld W1 without the steel rod 16 interposed therebetween, the weld zone 2 of the fillet weld W1 is cut off, the residual weld zone 6 which is left in the H-shaped steel 20 after the cutting-off is removed, and joining is performed again by the fillet weld W2 and the fillet weld W3 with the steel rod 16 interposed therebetween. In addition, in case where the H-shaped steel 20 and the steel sheet pile 10 of the combined steel sheet pile 1 illustrated in FIG. 21 are disassembled again, the weld zone 2x of the fillet weld W2 on the flange 22 side of the H-shaped steel 20 may be cut off at the surface C2 as the cutting surface.

Figure 23:
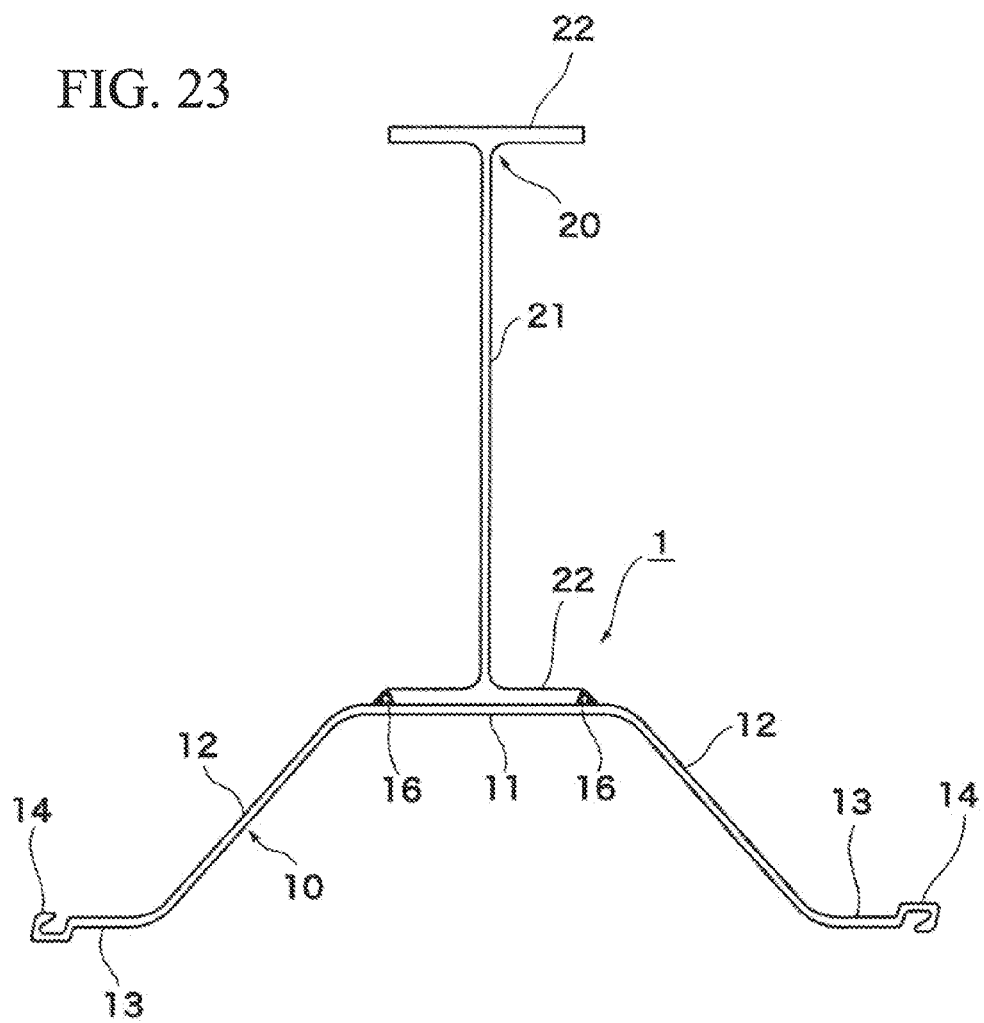
FIG. 23 is a plan view of a modification example of the combined steel sheet pile illustrated in FIG. 2.
Figure 24:
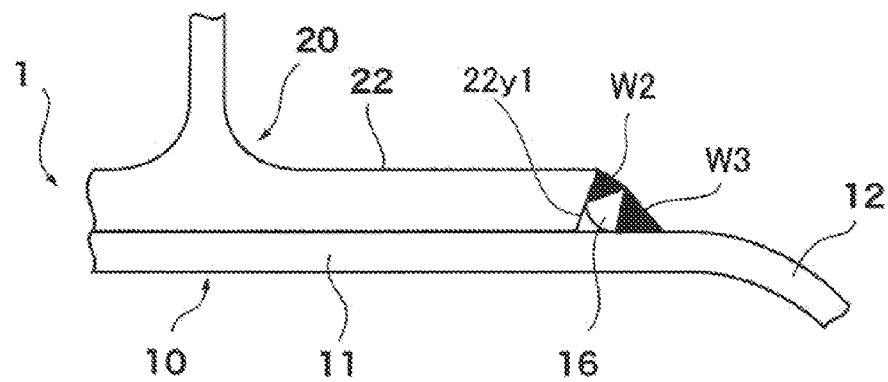
FIG. 24 is an enlarged plan view illustrating the weld zone of the fillet weld of the combined steel sheet pile illustrated in FIG. 23.

In addition, as described above, in a case of joining the H-shaped steel 20 and the steel sheet pile 10 by the fillet welds with the steel rod 16 interposed therebetween, as illustrated in FIGS. 23 and 24, the flange 22 of the H-shaped steel 20 may have tilted end edges 22y1. When the tilted end edges 22y1 illustrated in FIGS. 23 and 24 are provided, the amount of the steel rod 16 protruding is reduced. Therefore, operation safety is enhanced when the combined steel sheet pile 1 is assembled or disassembled and when the diaphragm wall is constructed using the combined steel sheet pile 1.

In a case of the combined steel sheet pile 1 as described above, when the form illustrated in FIG. 2 is described as a representative form, the section modulus about the axis of the direction Y in which the center of the combined steel sheet pile 1 illustrated in FIG. 2 passes through is preferably, for example, 3,500 cm$^3$/m to 14,000 cm$^3$/m. Specifically, in the combined steel sheet pile 1 for which the disassembling method according to this embodiment is used, the section modulus of the combined steel sheet pile 1 per 1 m of the wall width is preferably 3,500 cm$^3$/m to 14,000 cm$^3$/m. With the section modulus, the combined steel sheet pile 1 can be used as an earth-retaining combined steel sheet pile 1 for temporary installation and the like at a depth of about 10 to 25 m. Here, the section modulus is an integer obtained by dividing the second moment of area of the cross-section by the distances from the center axis to the end portions in the longitudinal direction and is determined by the shape of the cross-section and the position of the center axis. In addition, the second moment of the cross-section is defined as the sum of the products of a differential area element of the cross-section and the square of a distance from the center axis to the element.

Next, a method of, after the combined steel sheet pile 1 described above is used as a temporary installation member, pulling out and disassembling the combined steel sheet pile 1 for storage or reutilizing the combined steel sheet pile 1 will be described.

Figure 27A:
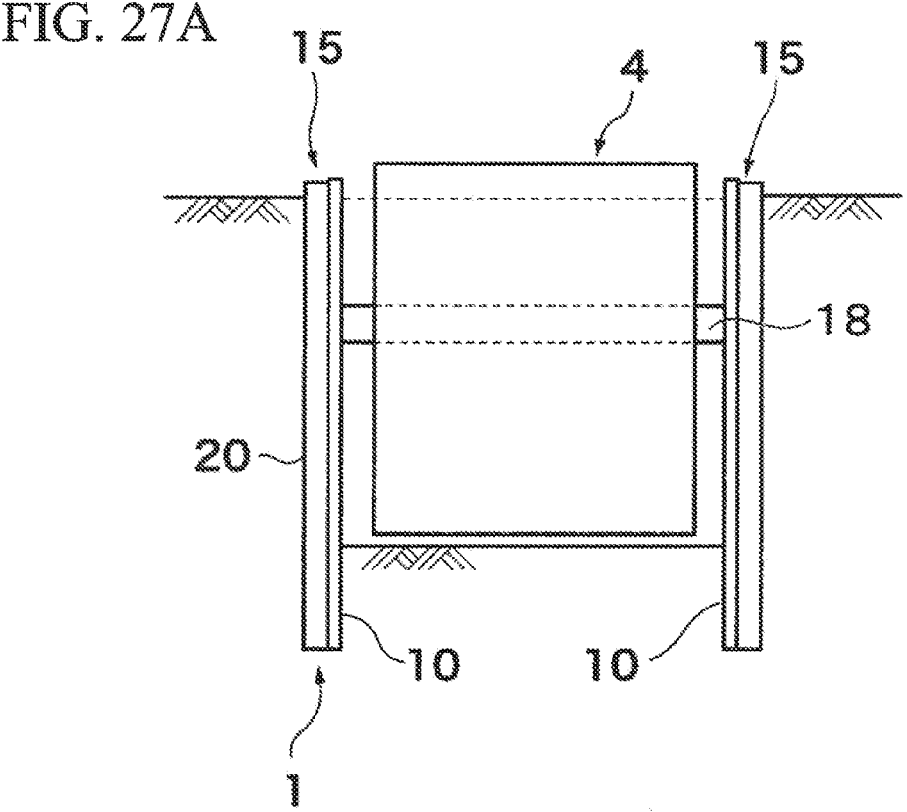
FIG. 27A is a schematic explanatory view illustrating an example of a method of constructing the diaphragm wall which uses the combined steel sheet pile.
Figure 27B:
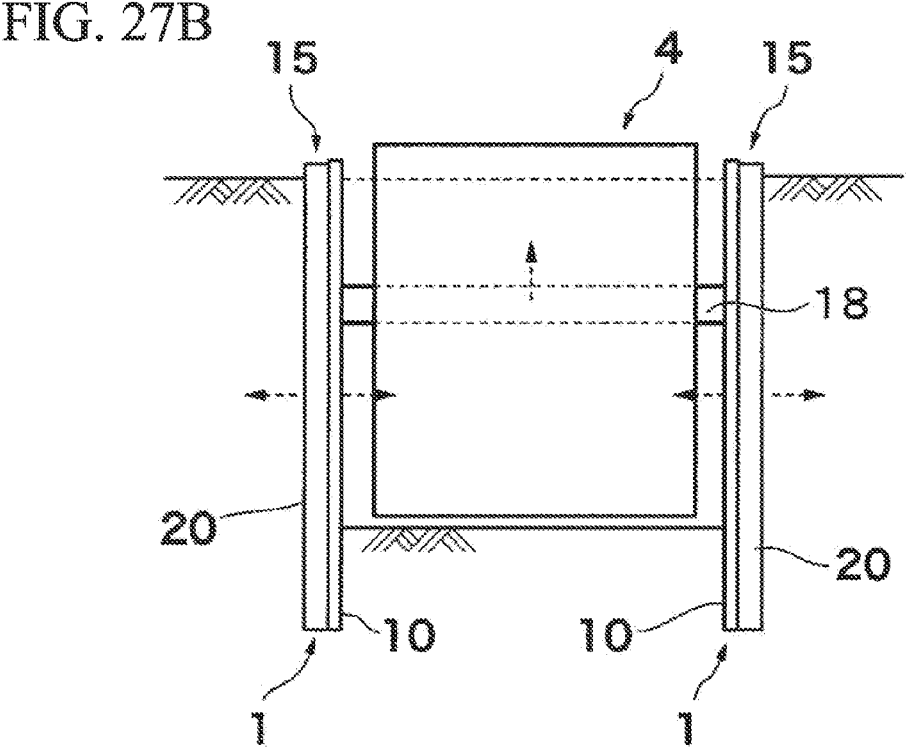
FIG. 27B is a schematic explanatory view illustrating an example of the method of constructing the diaphragm wall which uses the combined steel sheet pile.
Figure 27E:
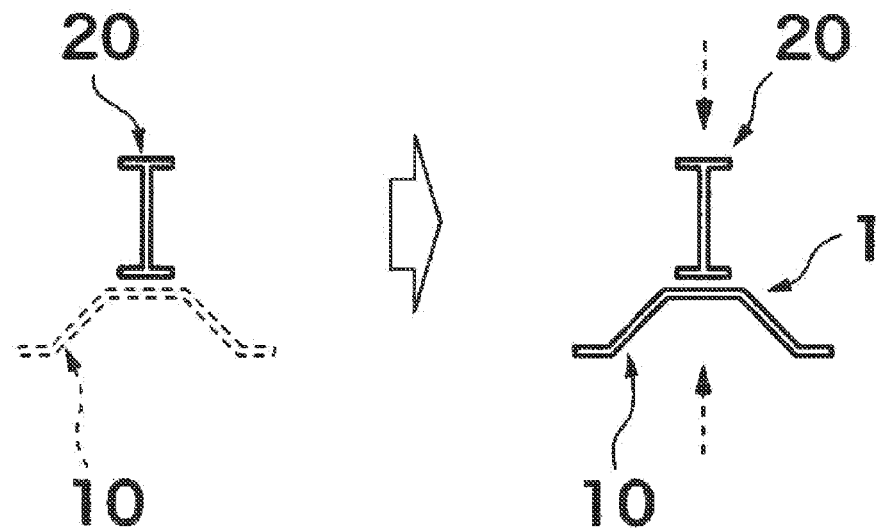
FIG. 27E is a schematic explanatory view illustrating an example of a method of reutilizing the combined steel sheet pile.
Figure 27F:
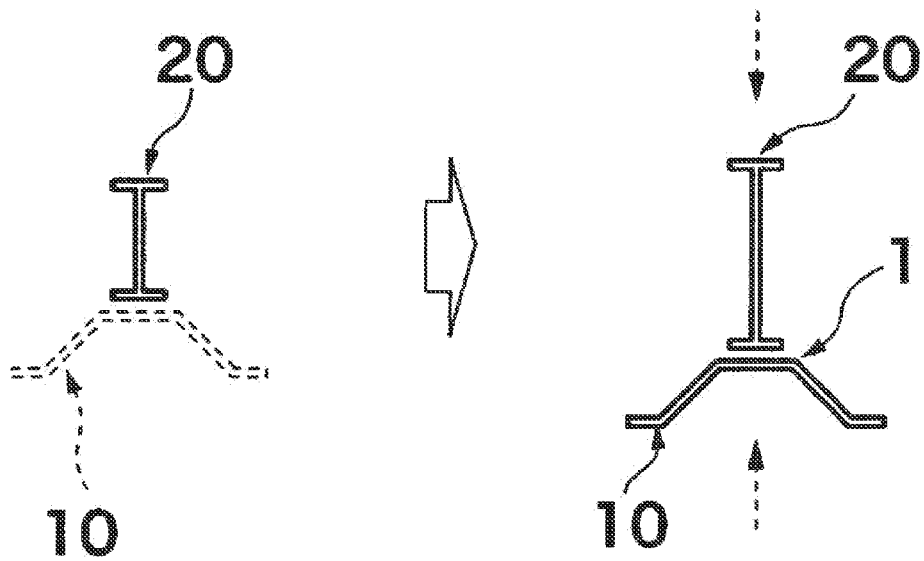
FIG. 27F is a schematic explanatory view illustrating another example of the method of reutilizing the combined steel sheet pile.

As illustrated in FIGS. 1A and 1B, the adjacent joints 14 of the combined steel sheet piles 1 are fitted to one another and are inserted into the ground. In addition, as illustrated in FIG. 27A, after the diaphragm walls 15 are constructed, the ground between the diaphragm walls 15 which oppose each other is excavated, and a strut 18 is installed therein, thereby constructing an underground structure 4. Thereafter, as illustrated in FIG. 27B, the space between the underground structure 4 and the diaphragm wall 15 is backfilled with excavated soil and the like, and the strut 18 is removed. In addition, as illustrated in FIG. 27C, the combined steel sheet piles 1 including the steel sheet pile 10 and the H-shaped steel 20 are pulled out by a construction machine. In addition, the pulled combined steel sheet pile 1 is installed so that the steel sheet pile 10 is positioned on the lower side on the ground. In addition, for example, in the case of the combined steel sheet pile 1 illustrated in FIG. 11, the weld zone 2 of the fillet weld W1 is cut off and separated by the disassembling method described above. Thereafter, as illustrated in FIG. 27D, about five layers of the steel sheet piles 10 arranged in parallel are stacked and the steel sheet piles 10 are further stacked thereon appropriately with spacers such as battens therebetween in a plurality of stages for storage. In addition, the H-shaped steels 20 are arranged in parallel and the steel sheet piles 10 are further stacked thereon appropriately with the spacers such as battens therebetween in a plurality of stages for storage. In addition, in a case where the steel sheet pile 10 which is worn needs to be replaced when the combined steel sheet pile 1 is reutilized, as illustrated in FIG. 27E, the worn steel sheet pile 10 is replaced with a new steel sheet pile 10. In addition, the new steel sheet pile 10 is joined to have the same structure as the joining structure by the fillet welds before the replacement or have a joining structure in which the positions of the fillet welds are shifted in the longitudinal direction, thereby assembling a new combined steel sheet pile 1. In addition, in a case where the stiffness of the combined steel sheet pile 1 needs to be further increased, as illustrated in FIG. 27F, the H-shaped steel 20 may be replaced with an H-shaped steel 20 having a larger beam height (girder height), in other words, an H-shaped steel 20 in which the dimension of the web 21 (H-shaped steel web) is large. In this manner, the combined steel sheet pile 1 can be installed in a deeper place, at the construction site of the diaphragm wall 15.

Second Embodiment

Next, the combined steel sheet pile 1, the diaphragm wall 15, and the method of disassembling a combined steel sheet pile according to a second embodiment of the present invention will be described. In addition, in each of the embodiments described below, differences from the first embodiment will be mainly described and, and since the other structures are the same as those of the first embodiment, overlapping descriptions will be omitted.

Figure 3A:
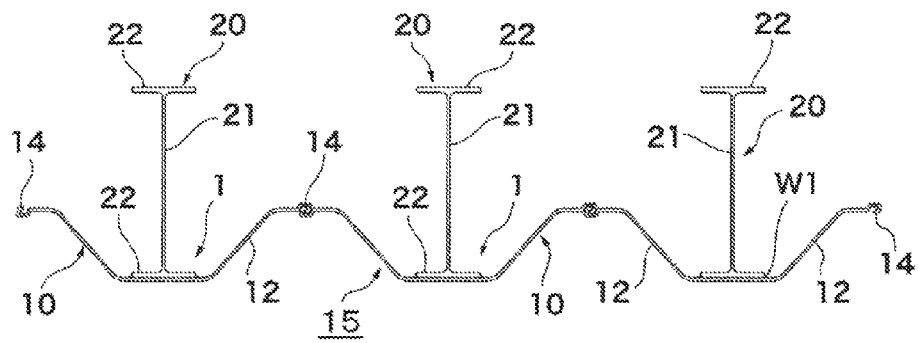
FIG. 3A is a plan view illustrating a diaphragm wall which uses a combined steel sheet pile according to a second embodiment of the present invention.
Figure 3B:
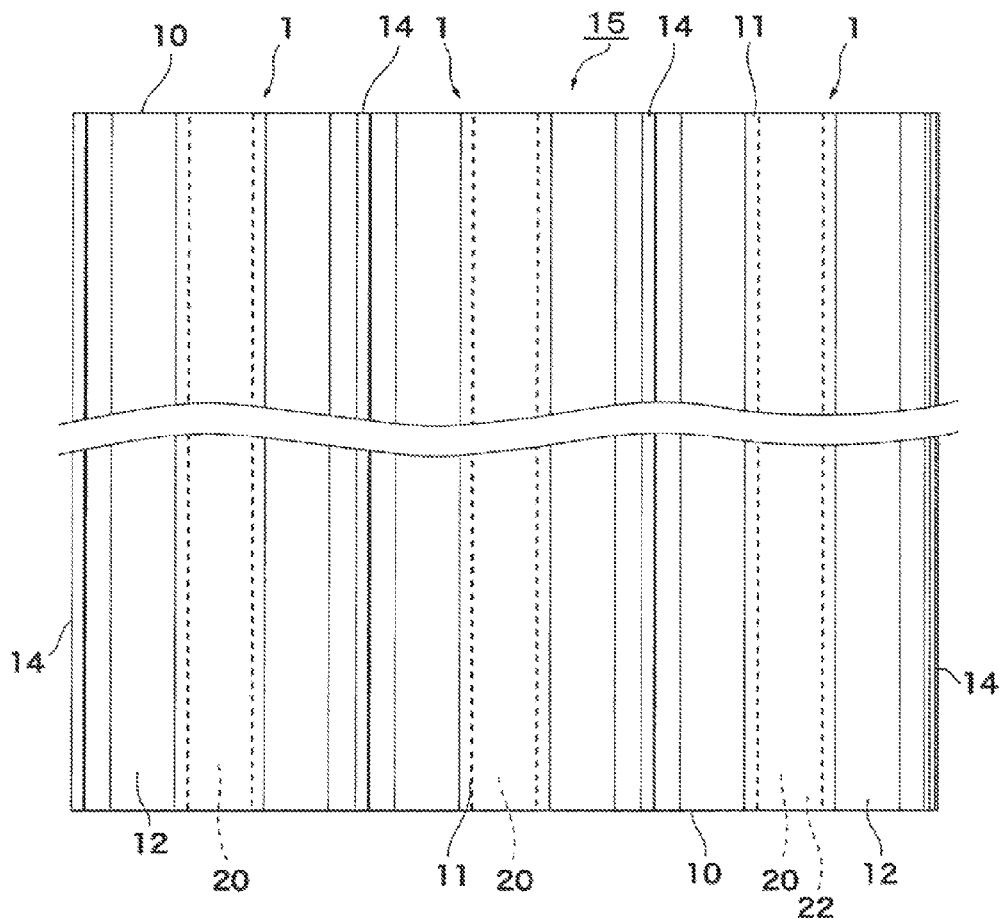
FIG. 3B is a partially cut away front view illustrating the diaphragm wall which uses the combined steel sheet pile according to the embodiment.
Figure 4:
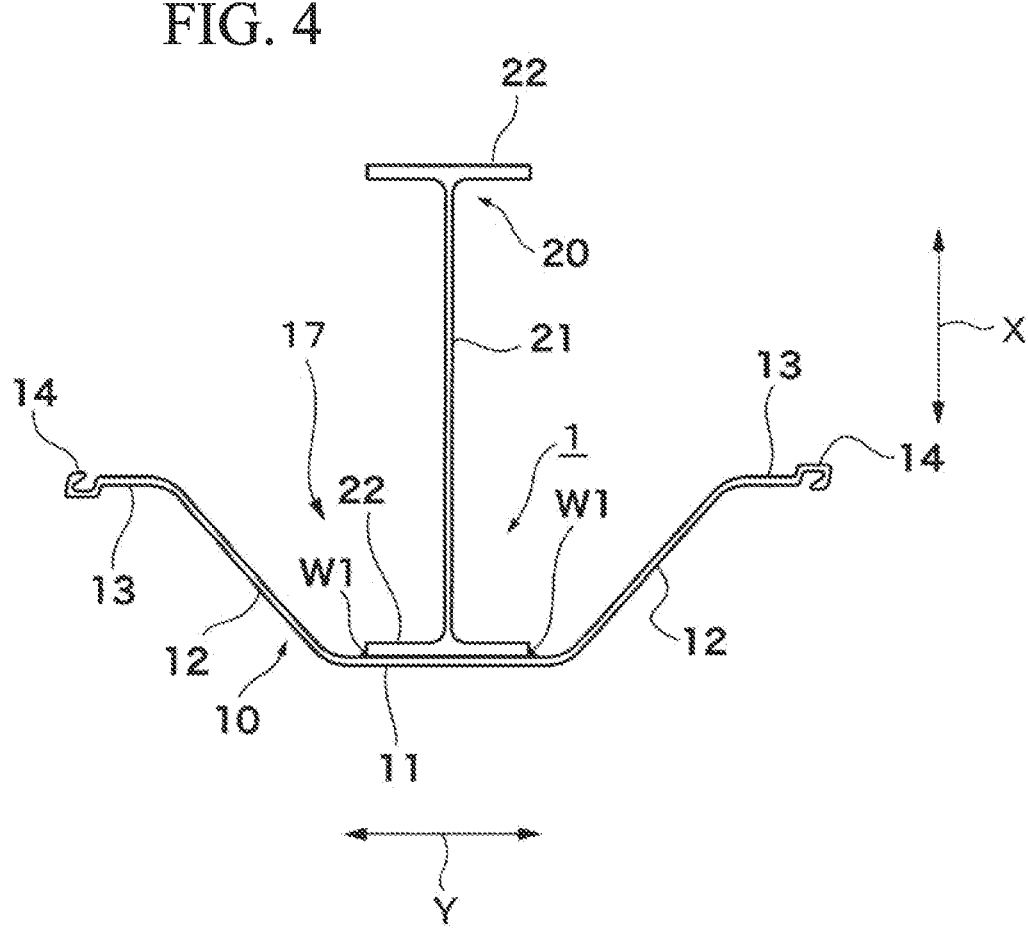
FIG. 4 is an enlarged plan view of the combined steel sheet pile used in the diaphragm wall illustrated in FIG. 3A.

FIG. 3A is a plan view illustrating the diaphragm wall 15 which uses the combined steel sheet pile 1 according to the second embodiment of the present invention. FIG. 3B is a partially cut away front view of the diaphragm wall 15 which uses the combined steel sheet pile 1 according to the embodiment. FIG. 4 is an enlarged plan view of the combined steel sheet pile 1 used in the diaphragm wall 15 illustrated in FIG. 3A. The combined steel sheet pile 1 of this embodiment includes the steel sheet pile 10 which is the hat-shaped steel sheet pile as in the first embodiment. However, this embodiment is different from the first embodiment in that the one flange 22 (H-shaped steel flange) of the H-shaped steel 20 overlaps and is joined to the surface of the concave portion 17 constituted by the web 11 and the pair of flanges 12 (steel sheet pile flanges) of the steel sheet pile 10. In the embodiment, bending stiffness about the axis of the direction Y in which the center of gravity in the direction Y in FIG. 4 passes through is reduced. However, the other features are the same as those of the first embodiment.

The combined steel sheet pile 1 of this embodiment uses the same steel sheet pile 10 and H-shaped steel 20 as those of the first embodiment, and has the same cross-sectional area when viewed in the cross-section perpendicular to the longitudinal direction. However, the combined steel sheet pile 1 of this embodiment is shorter in length in the direction X compared to the first embodiment. Therefore, the stiffness of the combined steel sheet pile 1 of this embodiment is reduced than that of the case of first embodiment. However, in a case where the diaphragm wall 15 is constructed by using the combined steel sheet pile 1 of this embodiment, the diaphragm wall 15 can be installed near the site boundary. Therefore, in a case where the site for installing the diaphragm wall 15 is narrow, the site can be efficiently used. The other features, for example, the method of constructing the diaphragm wall 15 using the combined steel sheet pile 1 and the method of pulling out the combined steel sheet pile 1 from the diaphragm wall 15 and disassembling the combined steel sheet pile 1 into the steel sheet pile 10 and the H-shaped steel 20, are the same as those of the first embodiment.

In addition, in this embodiment, each of the modification examples of the first embodiment can be applied. For example, the gap G may be formed between the flange 22 of the H-shaped steel 20 and the web 11 of the steel sheet pile 10. In addition, the gap G may be formed by the plate 8 between the flange 22 of the H-shaped steel 20 and the web 11 of the steel sheet pile 10. In this case, as in the first embodiment, joining by the fillet weld W1 illustrated in FIG. 15 may be performed, and the disassembling method illustrated in FIG. 16 may be employed. In addition, the steel rod 16 may be disposed to come into contact with the web 11 of the steel sheet pile 10 and the end edge 22y of the flange 22 of the H-shaped steel 20. In this case, as in the first embodiment, joining by the fillet weld W2 and the fillet weld W3 illustrated in FIG. 19A may be performed, and the disassembling method illustrated in FIG. 19B may be employed. In addition, as illustrated in FIG. 21, after disassembling the steel sheet pile 10 and the H-shaped steel 20 and grinding the weld zone 2 of the fillet weld W1, joining may be performed by the fillet weld W2 and the fillet weld W3 with the steel rod 16 interposed therebetween.

Third Embodiment

Figure 5:
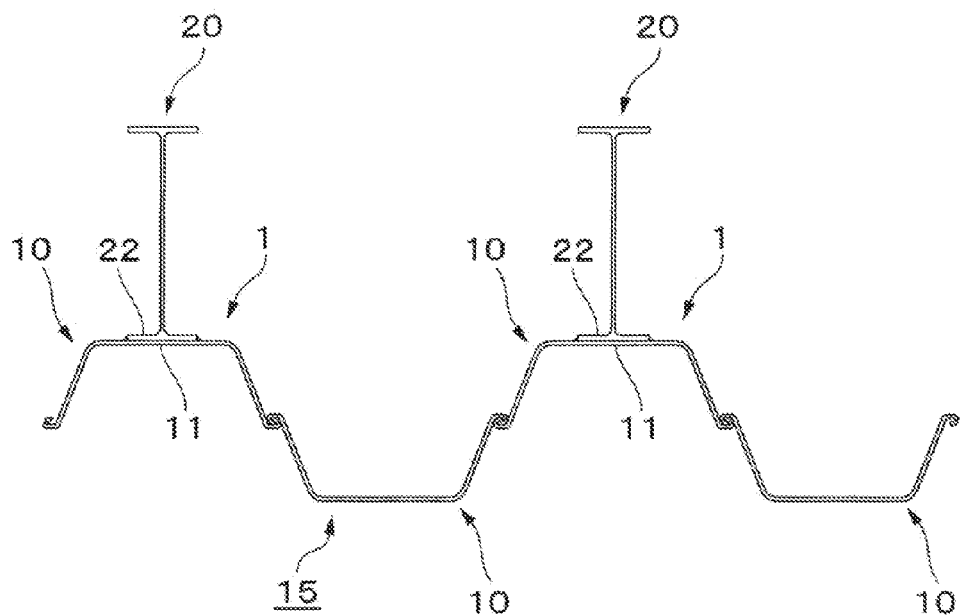
FIG. 5 is a plan view illustrating a diaphragm wall which uses a combined steel sheet pile according to a third embodiment of the present invention.
Figure 6:
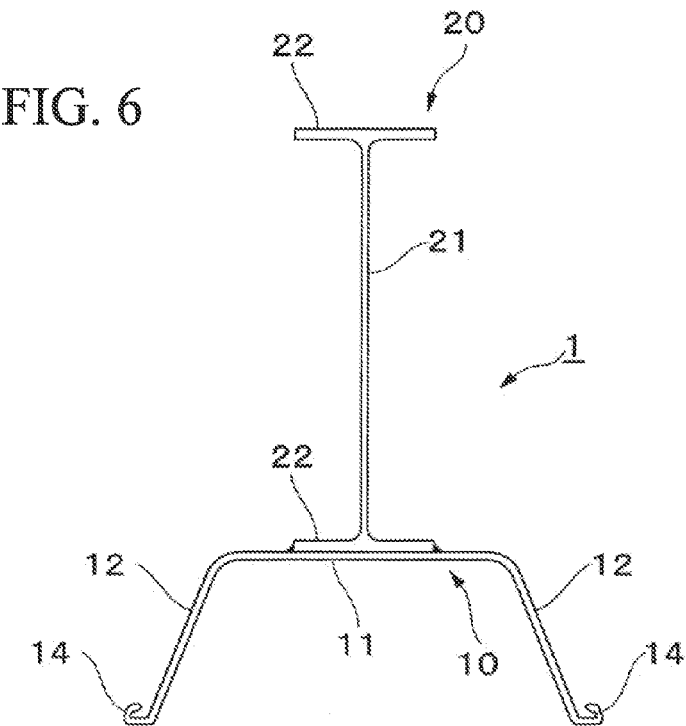
FIG. 6 is an enlarged plan view of the combined steel sheet pile used in the diaphragm wall illustrated in FIG. 5.

FIG. 5 is a plan view illustrating the diaphragm wall 15 which uses the combined steel sheet pile 1 according to a third embodiment of the present invention. FIG. 6 is an enlarged plan view of the combined steel sheet pile 1 used in the diaphragm wall 15 illustrated in FIG. 5. The combined steel sheet pile 1 of this embodiment includes the steel sheet pile 10 having a U shape when viewed in the cross-section perpendicular to the longitudinal direction. The steel sheet pile 10 is configured as the U-shaped steel sheet pile which includes, when viewed in the cross-section, the web 11 (steel sheet pile web) provided at the center portion in the sheet width direction, the pair of flanges 12 (steel sheet pile flanges) provided to be tilted from both end portions of the web 11 toward one surface side of the web 11, and the joints 14 provided at the tip ends of the flanges 12.

In the embodiment, the U-shaped steel sheet pile which is widely used as a permanent structure or for temporary earth-retaining installation can be used as the steel sheet pile 10. In addition, by assembling the steel sheet pile 10 which is the U-shaped steel sheet pile that is widely used with the H-shaped steel 20, the combined steel sheet pile 1 having high versatility and higher stiffness can be achieved. In addition, in this embodiment, each of the modification examples of the first embodiment can be applied. For example, the gap G may be formed between the flange 22 of the H-shaped steel 20 and the web 11 of the steel sheet pile 10. The gap G may be formed by the plate 8 between the flange 22 of the H-shaped steel 20 and the web 11 of the steel sheet pile 10. Otherwise, the steel rod 16 may be disposed and joined to come into contact with the web 11 of the steel sheet pile 10 and the end edge 22y of the flange 22 of the H-shaped steel 20. In addition, the method of constructing the diaphragm wall 15 using the combined steel sheet pile 1, the method of pulling out the combined steel sheet pile 1 from the diaphragm wall 15 and disassembling the combined steel sheet pile 1 into the steel sheet pile 10 and the H-shaped steel 20, and the like are the same as those of the first embodiment.

Fourth Embodiment

Figure 7:
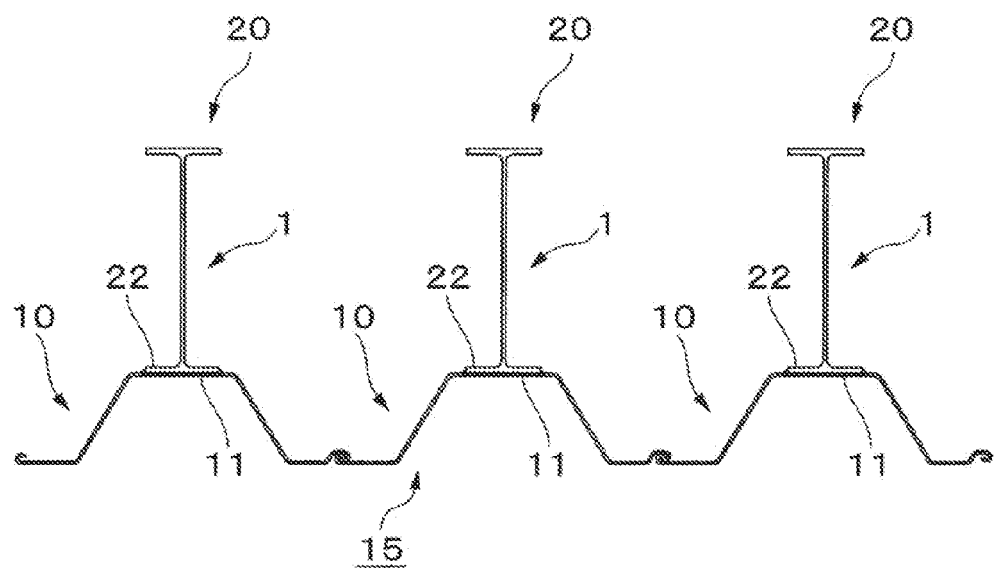
FIG. 7 is a plan view of a diaphragm wall which uses a combined steel sheet pile according to a fourth embodiment of the present invention.
Figure 8:
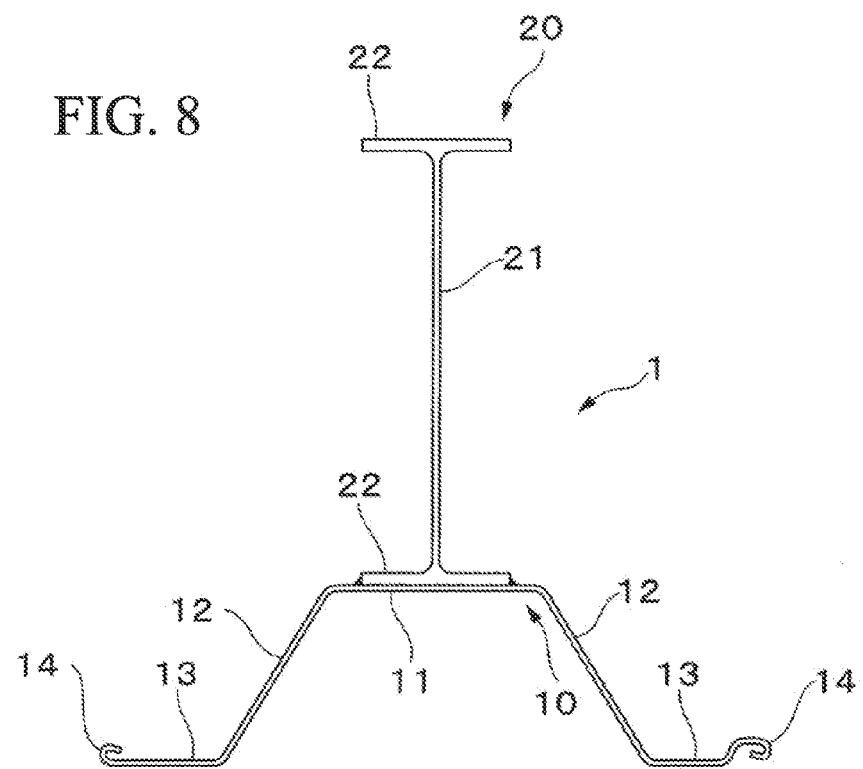
FIG. 8 is an enlarged plan view of the combined steel sheet pile used in the diaphragm wall illustrated in FIG. 7.

FIG. 7 is a plan view illustrating the diaphragm wall 15 which uses the combined steel sheet pile 1 according to a fourth embodiment of the present invention. FIG. 8 is an enlarged plan view of the combined steel sheet pile 1 used in the diaphragm wall 15 illustrated in FIG. 7. The combined steel sheet pile 1 of this embodiment includes a steel sheet pile 10 which is a cold-rolled steel sheet pile molded by cold rolling. The steel sheet pile 10 may not be formed in a complex shape unlike a hot-rolled steel sheet pile which is molded by hot rolling and thus has high shape imparting properties as in the first embodiment. However, in this embodiment, the cold-rolled steel sheet pile which is manufactured at low cost and high versatility due to cold rolling performed with high productivity can be used as the steel sheet pile 10. In addition, in this embodiment, each of the modification examples of the first embodiment can be applied. In addition, the method of constructing the diaphragm wall 15 using the combined steel sheet pile 1, the method of pulling out the combined steel sheet pile 1 from the diaphragm wall 15 and disassembling the combined steel sheet pile 1 into the steel sheet pile 10 and the H-shaped steel 20, and the like are the same as those of the first embodiment.

Fifth Embodiment

Figure 9:
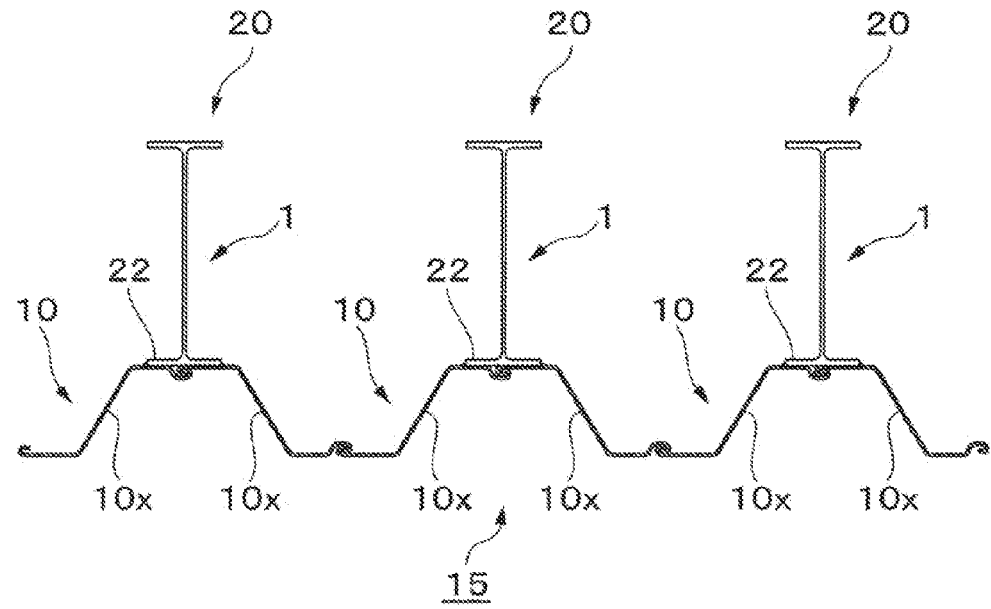
FIG. 9 is a plan view of a diaphragm wall which uses a combined steel sheet pile according to a fifth embodiment of the present invention.
Figure 10:
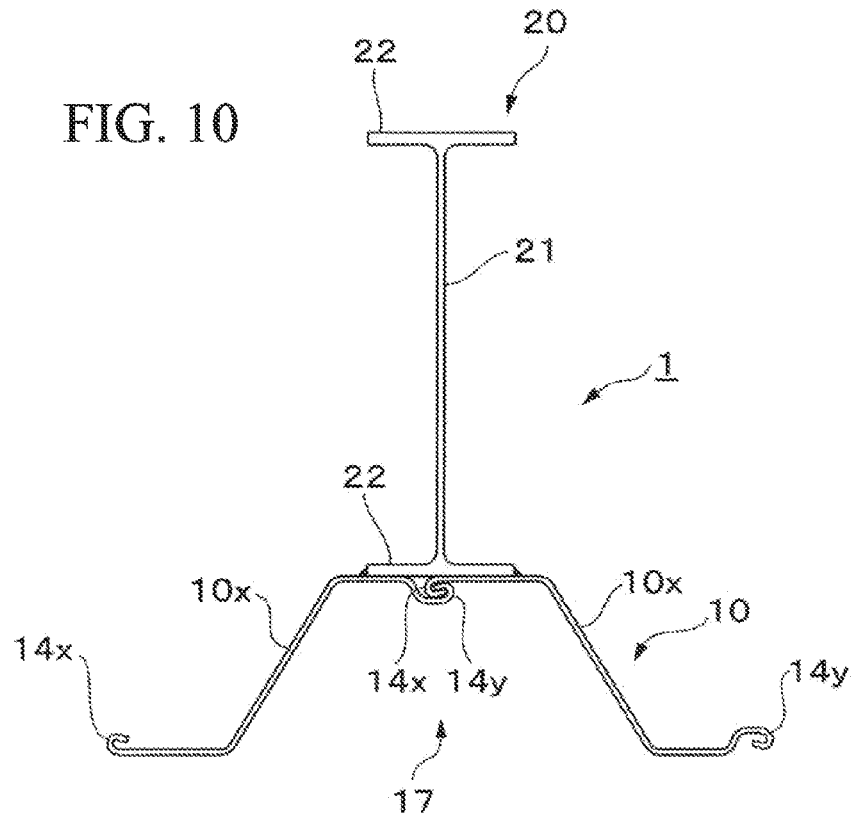
FIG. 10 is an enlarged plan view of the combined steel sheet pile used in the diaphragm wall illustrated in FIG. 9.

FIG. 9 is a plan view illustrating the diaphragm wall 15 which uses the combined steel sheet pile 1 according to a fifth embodiment of the present invention. FIG. 10 is an enlarged plan view of the combined steel sheet pile 1 used in the diaphragm wall 15 illustrated in FIG. 9. As illustrated in FIG. 10, in this embodiment, the steel sheet pile 10 is configured as a hat-shaped steel sheet pile which includes two Z-shaped steel sheet piles 10x and has a hat shape when viewed in the cross-section perpendicular to the longitudinal direction by fitting a joint 14x of one Z-shaped steel sheet pile 10x to a joint 14y of the another Z-shaped steel sheet pile 10x. In the Z-shaped steel sheet pile 10x, the joint 14x and the joint 14y at both end portions in the sheet width direction do not have the same shape when viewed in the cross-section. The joint 14x and the joint 14y are fitted to each other by reversing the another Z-shaped steel sheet pile 10x to the one Z-shaped steel sheet pile 10x, thereby forming the steel sheet pile 10 having the hat shape. In this embodiment, each of the modification examples of the first embodiment can be applied. In addition, the method of constructing the diaphragm wall 15 using the combined steel sheet pile 1, the method of pulling out the combined steel sheet pile 1 from the diaphragm wall 15 and disassembling the combined steel sheet pile 1 into the steel sheet pile 10 and the H-shaped steel 20, and the like are the same as those of the case of the first embodiment. In addition, the one flange 22 (H-shaped steel flange) of the H-shaped steel 20 may overlap and be joined to the surface of the concave portion 17 constituted of the steel sheet pile 10 of this embodiment. In this case, while the gap G is easily formed by the joint 14x and the joint 14y of the Z-shaped steel sheet piles 10x which is present on the surface of the concave portion 17, the steel sheet pile 10 and the H-shaped steel 20 can be joined together by the fillet weld W1.

In the combined steel sheet pile 1 of each of the embodiments, the following effects (1) to (3) can be obtained.

(1) Since the combined steel sheet pile 1 is easily disassembled by cutting off the weld zone 2 of the fillet weld W1 which joins the steel sheet pile 10 and the H-shaped steel 20 after being pulled out, it is possible to separately transport and store the steel sheet pile 10 and the H-shaped steel 20. Therefore, transport and storage costs can be reduced.

(2) Since only the steel sheet piles 10 which is likely to wear is replaced for reutilization in a case of installation on the ground, the constructing cost can be reduced. (In the case of the related art, a part of the steel sheet pile 10 is single-use, and thus the combined steel sheet pile 1 is also single-use. However, according to each of the embodiments, the H-shaped steels 20 which account for approximately 60 to 70 percent of the entire steel weight can be used for other purposes, which are economically advantageous.)

(3) During reutilization, the H-shaped steels 20 having different sizes can be combined with the steel sheet piles 10. Accordingly, in a case where different section stiffness is needed, a new combined steel sheet pile 1 can be easily formed, and thus acceptable wall body specifications can be achieved.

In addition, like the forms illustrated in FIGS. 1A to 24, for example, the weld zone 2 of the fillet weld W1 has a leg length with a smaller dimension than the flange thickness of the H-shaped steel 20, and thus removal by fusing or removal by grinding using an electrical grinding tool such as a grinder is facilitated.

In each of the embodiments, a combined steel sheet pile 1 which uses a steel sheet pile other than the steel sheet pile 10 and for example, an I-shaped steel other than the H-shaped steel 20 may also be utilized.

INDUSTRIAL APPLICABILITY

According to the aspects of the present invention, a combined steel sheet pile which can be constructed as one body during installation, and after being pulled out, can be easily disassembled by cutting off a weld zone of fillet welding which joins a steel sheet pile to an H-shaped steel, a diaphragm wall thereof, and a method of disassembling the combined steel sheet pile can be provided, and thus high industrial applicability is achieved.

DESCRIPTION OF REFERENCE NUMERALS AND SIGNS

1: COMBINED STEEL SHEET PILE
2: WELD ZONE 2 (WELDED METAL)
3: LONG SIDE
4: UNDERGROUND STRUCTURE
5: SHORT SIDE
6: RESIDUAL WELD ZONE (RESIDUAL WELD ZONE OF H-SHAPED STEEL FLANGE)
7, 7x, 7y: BOUNDARY PORTION
8: PLATE
9: RESIDUAL WELD ZONE (RESIDUAL WELD ZONE OF STEEL SHEET PILE WEB)
10: STEEL SHEET PILE
11: WEB (STEEL SHEET PILE WEB)
12: FLANGE (STEEL SHEET PILE FLANGE)
13: ARM
14: JOINT
15: DIAPHRAGM WALL
16: STEEL ROD
17: CONCAVE PORTION

18: STRUT
20: H-SHAPED STEEL
21: WEB (H-SHAPED STEEL WEB)
22: FLANGE (H-SHAPED STEEL FLANGE)
22y: END EDGE (END EDGE OF H-SHAPED STEEL FLANGE)
G: GAP
M: UNWELD ZONE
W1, W2, W3: FILLET WELD

The invention claimed is:

1. A method of disassembling a combined steel sheet pile, the combined steel sheet pile including a steel sheet pile and an H-shaped steel, wherein
the steel sheet pile has, when viewed in a cross-section perpendicular to a longitudinal direction, a web at a center portion in a sheet width direction, and joints at both end portions in the sheet width direction;
the web in one surface of the steel sheet pile is overlapped with an H-shaped steel flange of the H-shaped steel;
the steel sheet pile and the H-shaped steel are joined together by a fillet weld at an end edge of the H-shaped steel flange; and
a throat depth plane which extends from a corner where the H-shaped steel flange and the steel sheet pile are met exists in a weld zone formed by the fillet weld, the method comprising,
when viewed in the cross-section, in the weld zone, cutting the weld zone along a plane which is closer than the throat depth plane to the H-shaped steel side and which is formed along the longitudinal direction of the combined steel sheet pile, and disassembling the combined steel sheet pile into the steel sheet pile and the H-shaped steel.

2. The method of disassembling a combined steel sheet pile according to claim 1,
wherein a gap of equal to or more than 0.2 mm and equal to or less than 5 mm is provided between the web of the steel sheet pile and the end edge of the H-shaped steel flange, and
the disassembling is performed by the cutting-off to reach the gap.

3. The method of disassembling a combined steel sheet pile according to claim 2,
wherein the gap is provided by disposing a plate having a plate thickness dimension of equal to or more than 0.2 mm and equal to or less than 5 mm to be interposed between the web of the steel sheet pile and the end edge of the H-shaped steel flange.

4. The method of disassembling a combined steel sheet pile according to claim 1,
wherein a steel rod is further disposed to come into contact with the web of the steel sheet pile and the end edge of the H-shaped steel flange, and
the disassembling of the combined steel sheet pile in which the steel sheet pile and the H-shaped steel are joined together by the fillet weld with the steel rod interposed therebetween is performed by cutting the weld zone along the plane to leave a larger amount of the steel rod on the steel sheet pile than on the end edge.

* * * * *